US009489342B2

(12) United States Patent
Gupta et al.

(10) Patent No.: US 9,489,342 B2
(45) Date of Patent: Nov. 8, 2016

(54) SYSTEMS, METHODS, AND COMPUTER PROGRAM PRODUCTS FOR PERFORMING MATHEMATICAL OPERATIONS

(71) Applicant: Intel Corporation, Santa Clara, CA (US)

(72) Inventors: Niraj Gupta, Bangalore (IN); Karthik N, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 14/127,178

(22) PCT Filed: Jun. 21, 2013

(86) PCT No.: PCT/US2013/047081
§ 371 (c)(1),
(2) Date: Dec. 18, 2013

(87) PCT Pub. No.: WO2014/105154
PCT Pub. Date: Jul. 3, 2014

(65) Prior Publication Data
US 2014/0379774 A1    Dec. 25, 2014

(30) Foreign Application Priority Data

Dec. 24, 2012  (IN) .......................... 5451/CHE/2012

(51) Int. Cl.
*G06F 17/10* (2006.01)
*G06F 17/15* (2006.01)
*G06F 17/16* (2006.01)
(52) U.S. Cl.
CPC .............. *G06F 17/10* (2013.01); *G06F 17/15* (2013.01); *G06F 17/16* (2013.01)

(58) Field of Classification Search
None
See application file for complete search history.

(56) References Cited

U.S. PATENT DOCUMENTS

| 4,896,287 | A | * | 1/1990 | O'Donnell ............ G06F 7/4812 |
| | | | | 708/622 |
| 5,771,391 | A | | 6/1998 | Lloyd et al. |
| 6,711,301 | B1 | | 3/2004 | Tran et al. |
| 7,870,182 | B2 | | 1/2011 | Thendean et al. |
| 8,131,793 | B2 | | 3/2012 | Willson, Jr. |

(Continued)

OTHER PUBLICATIONS

International Search Report and Written Opinion received for PCT Patent Application No. PCT/US2013/047081, mailed on Oct. 16, 2013, 14 Pages.

(Continued)

*Primary Examiner* — Michael D Yaary
(74) *Attorney, Agent, or Firm* — Green, Howard & Mughal LLP

(57) ABSTRACT

The system has first, second, third, and fourth subsystems. Each subsystem has first and second multipliers coupled, respectively, to first and second adders. Each multiplier has two inputs. The first adder is coupled to a first output, a first accumulator, and a bit shifter. The bit shifter is coupled to a third adder. The third adder is coupled to a multiplexer. The multiplexer is coupled to a second output and a second accumulator. The second adder is coupled to the third adder and the multiplexer. The first outputs of the first and second subsystems are coupled directly to a fourth adder, the second outputs of the first and second subsystems are coupled directly to a fifth adder, the first outputs of the third and fourth subsystems are coupled directly to a sixth adder, and the second outputs of the third and fourth subsystems are coupled directly to a seventh adder.

28 Claims, 22 Drawing Sheets

(56) References Cited

U.S. PATENT DOCUMENTS

| | | |
|---|---|---|
| 2003/0086025 A1 | 5/2003 | Lee et al. |
| 2006/0059215 A1* | 3/2006 | Maharatna ............ G06F 7/5446 708/200 |
| 2007/0130241 A1* | 6/2007 | Bredehoft ............. G06F 7/5446 708/441 |
| 2009/0083355 A1 | 3/2009 | Takemori |
| 2010/0306301 A1 | 12/2010 | Hurd et al. |

OTHER PUBLICATIONS

International Preliminary Report on Patentability for International Patent Application No. PCT/US2013/047081, mailed on Jul. 9, 2015.

* cited by examiner

FIG. 9A $$m_{11} = \begin{bmatrix} 0\times0 & & \\ 2\times0 & & \\ 0\times0 & & \end{bmatrix} \begin{bmatrix} 1\times0 & 0\times0 & \\ 4\times1 & -2\times2 & 3 \\ -1\times4 & 0\times5 & 6 \\ 7 & 8 & 9 \end{bmatrix}$$

$$m_{12} = \begin{bmatrix} 0\times0 & 1\times0 & 0\times0 \\ 2\times1 & 4\times2 & -2\times3 \\ 0\times4 & -1\times5 & 0\times6 \\ 7 & 8 & 9 \end{bmatrix}$$

$$m_{13} = \begin{bmatrix} & & 0\times0 \\ & & -2\times0 \\ & & 0\times0 \end{bmatrix} \begin{bmatrix} 1 & 0\times0 & 1\times0 \\ 4 & 2\times2 & 4\times3 \\ 7 & 0\times5 & -1\times6 \\ & 8 & 9 \end{bmatrix}$$

$$m_{21} = \begin{bmatrix} 0 \times 0 & 1 \times 1 & 0 \times 2 & 3 \\ 2 \times 0 & 4 \times 4 & -2 \times 5 & 6 \\ 0 \times 0 & -1 \times 7 & 0 \times 8 & 9 \end{bmatrix}$$

$$m_{22} = \begin{bmatrix} 0 \times 1 & 1 \times 2 & 0 \times 3 \\ 2 \times 4 & 4 \times 5 & -2 \times 6 \\ 0 \times 7 & -1 \times 8 & 0 \times 9 \end{bmatrix}$$

$$m_{23} = \begin{bmatrix} 1 & 0 \times 2 & 1 \times 3 & 0 \times 0 \\ 4 & 2 \times 5 & 4 \times 6 & -2 \times 0 \\ 7 & 0 \times 8 & -1 \times 9 & 0 \times 0 \end{bmatrix}$$

FIG. 9B $$m_{31} = \begin{bmatrix} 1 & 2 & 3 \\ 1\times 4 & 0\times 5 & 6 \\ 4\times 7 & -2\times 8 & 9 \\ -1\times 0 & 0\times 0 & \end{bmatrix} \begin{bmatrix} 0\times 0 \\ 2\times 0 \\ 0\times 0 \end{bmatrix}$$

$$m_{32} = \begin{bmatrix} 1 & 2 & 3 \\ 0\times 4 & 1\times 5 & 0\times 6 \\ 2\times 7 & 4\times 8 & -2\times 9 \\ 0\times 0 & -1\times 0 & 0\times 0 \end{bmatrix}$$

$$m_{33} = \begin{bmatrix} 1 & 2 & 3 \\ 4 & 0\times 5 & 1\times 6 \\ 7 & 2\times 8 & 4\times 9 \\ & 0\times 0 & -1\times 0 \end{bmatrix} \begin{bmatrix} 0\times 0 \\ -2\times 0 \\ 0\times 0 \end{bmatrix}$$

FIG. 9C

FIG. 10A $$m_{11} = \begin{bmatrix} 0\times1 & 2\times1 & 0\times4 \end{bmatrix} \begin{bmatrix} 1\times1 & 0\times2 & 3 \\ 4\times1 & -2\times2 & 6 \\ -1\times4 & 0\times5 & 9 \\ 7 & 8 & \end{bmatrix}$$

$$m_{12} = \begin{bmatrix} 0\times1 & 1\times2 & 0\times3 \\ 2\times1 & 4\times2 & -2\times3 \\ 0\times4 & -1\times5 & 0\times6 \\ 7 & 8 & 9 \end{bmatrix}$$

$$m_{13} = \begin{bmatrix} 1 & 0\times2 & 1\times3 & 0\times3 \\ 4 & 2\times2 & 4\times3 & -2\times3 \\ 7 & 0\times5 & -1\times6 & 0\times6 \\ & 8 & 9 & \end{bmatrix}$$

$$m_{21} = \begin{bmatrix} 0 \times 1 & & \\ 2 \times 4 & & \\ 0 \times 7 & & \end{bmatrix} \begin{bmatrix} 1 \times 1 & 0 \times 2 & 3 \\ 4 \times 4 & -2 \times 5 & 6 \\ -1 \times 7 & 0 \times 8 & 9 \end{bmatrix}$$

$$m_{22} = \begin{bmatrix} 0 \times 1 & 1 \times 2 & 0 \times 3 \\ 2 \times 4 & 4 \times 5 & -2 \times 6 \\ 0 \times 7 & -1 \times 8 & 0 \times 9 \end{bmatrix}$$

$$m_{23} = \begin{bmatrix} 1 & 0 \times 2 & 1 \times 3 \\ 4 & 2 \times 5 & 4 \times 6 \\ 7 & 0 \times 8 & -1 \times 9 \end{bmatrix} \begin{bmatrix} 0 \times 3 \\ -2 \times 6 \\ 0 \times 9 \end{bmatrix}$$

FIG. 10B

FIG. 11A $$m_{11} = \begin{bmatrix} 0 \times 5 & 1 \times 4 & 0 \times 5 & 3 \\ 2 \times 2 & 4 \times 1 & -2 \times 2 & 6 \\ 0 \times 5 & -1 \times 4 & 0 \times 5 & 9 \\ & 7 & 8 & \end{bmatrix}$$

$$m_{12} = \begin{bmatrix} 1 \times 5 & 0 \times 6 & \\ 0 \times 4 & 4 \times 2 & -2 \times 3 \\ 2 \times 1 & -1 \times 5 & 0 \times 6 \\ 0 \times 4 & 7 & 8 & 9 \end{bmatrix}$$

$$m_{13} = \begin{bmatrix} 0 \times 5 & 1 \times 6 & 0 \times 5 \\ 1 & 2 \times 2 & 4 \times 3 & -2 \times 2 \\ 4 & 0 \times 5 & -1 \times 6 & 0 \times 5 \\ 7 & 8 & 9 \end{bmatrix}$$

FIG. 11B $$m_{21} = \begin{bmatrix} 0\times2 \\ 2\times5 \\ 0\times8 \end{bmatrix} \begin{bmatrix} 1\times1 \\ 4\times4 \\ -1\times7 \end{bmatrix} \begin{bmatrix} 0\times2 \\ -2\times5 \\ 0\times8 \end{bmatrix} \begin{bmatrix} 3 \\ 6 \\ 9 \end{bmatrix}$$

$$m_{22} = \begin{bmatrix} 0\times1 \\ 2\times4 \\ 0\times7 \end{bmatrix} \begin{bmatrix} 1\times2 \\ 4\times5 \\ -1\times8 \end{bmatrix} \begin{bmatrix} 0\times3 \\ -2\times6 \\ 0\times9 \end{bmatrix}$$

$$m_{23} = \begin{bmatrix} 1 \\ 4 \\ 7 \end{bmatrix} \begin{bmatrix} 0\times2 \\ 2\times5 \\ 0\times8 \end{bmatrix} \begin{bmatrix} 1\times3 \\ 4\times6 \\ -1\times9 \end{bmatrix} \begin{bmatrix} 0\times2 \\ -2\times5 \\ 0\times8 \end{bmatrix}$$

$$p_{11} = \begin{bmatrix} -1 \times 1 & 0 \times 2 & 3 \\ 4 \times 1 & 2 \times 2 & 6 \\ 1 \times 4 & 0 \times 5 & 9 \\ 7 & 8 & \end{bmatrix}$$

$$\begin{bmatrix} 0 \times 1 \\ -2 \times 1 \\ 0 \times 4 \end{bmatrix}$$

$$p_{12} = \begin{bmatrix} 0 \times 1 & -1 \times 2 & 0 \times 3 \\ -2 \times 1 & 4 \times 2 & 2 \times 3 \\ 0 \times 4 & 1 \times 5 & 0 \times 6 \\ 7 & 8 & 9 \end{bmatrix}$$

$$p_{13} = \begin{bmatrix} & 0 \times 2 & 0 \times 3 \\ & -2 \times 2 & 2 \times 3 \\ & 0 \times 5 & 0 \times 6 \\ & 8 & \end{bmatrix}$$

$$\begin{bmatrix} 1 & 0 \times 2 & -1 \times 3 \\ 4 & -2 \times 2 & 4 \times 3 \\ 7 & 0 \times 5 & 1 \times 6 \\ & 8 & 9 \end{bmatrix}$$

FIG. 12A $$p_{21} \begin{bmatrix} 0 \times 1 & & & \\ -2 \times 4 & & & \\ 0 \times 7 & & & \end{bmatrix} \begin{bmatrix} -1 \times 1 & 0 \times 2 & 3 \\ 4 \times 4 & 2 \times 5 & 6 \\ 1 \times 7 & 0 \times 8 & 9 \end{bmatrix}$$

$$p_{22} \begin{bmatrix} 0 \times 1 & -1 \times 2 & 0 \times 3 \\ -2 \times 4 & 4 \times 5 & 2 \times 6 \\ 0 \times 7 & 1 \times 8 & 0 \times 9 \end{bmatrix}$$

$$p_{23} \begin{bmatrix} 1 & 0 \times 2 & -1 \times 3 & 0 \times 3 \\ 4 & -2 \times 5 & 4 \times 6 & 2 \times 6 \\ 7 & 0 \times 8 & 1 \times 9 & 0 \times 9 \end{bmatrix}$$

FIG. 12B $$p_{31} = \begin{bmatrix} 1 & 2 & 3 \\ -1\times4 & 0\times5 & 6 \\ 4\times7 & 2\times8 & 9 \\ 1\times7 & 0\times8 & \end{bmatrix} \begin{bmatrix} 0\times4 \\ -2\times7 \\ 0\times7 \end{bmatrix}$$

$$p_{32} = \begin{bmatrix} 1 & 2 & 3 \\ 0\times4 & -1\times5 & 0\times6 \\ -2\times7 & 4\times8 & 2\times9 \\ 0\times7 & 1\times8 & 0\times9 \end{bmatrix}$$

$$p_{33} = \begin{bmatrix} 1 & 2 & 3 \\ 4 & 0\times5 & -1\times6 \\ 7 & -2\times8 & 4\times9 \\ & 0\times8 & 1\times9 \end{bmatrix} \begin{bmatrix} 0\times6 \\ 2\times9 \\ 0\times9 \end{bmatrix}$$

FIG. 12C

SYSTEMS, METHODS, AND COMPUTER PROGRAM PRODUCTS FOR PERFORMING MATHEMATICAL OPERATIONS

BACKGROUND

A signal is a function that conveys information. Values of the abscissa of the function may change continuously or at discrete intervals. Likewise, values of the ordinate of the function may change continuously (analog) or at discrete intervals (digital). An image is a signal that conveys information in two dimensions. A digital image conveys information in two dimensions at discrete intervals through an array of picture elements, or pixels.

Mathematical operations may be used to process signals. In the case of a digital image, the discrete values of a function may be arranged in a matrix so that mathematical operations are performed with respect to the elements in the matrix. Mathematical operations may be used to process a digital image for a variety of reasons. For example, a convolution operation may be used for computer vision, statistics, and probability, and for image and signal processing for noise removal, feature enhancement, detail restoration, and for other purposes. A cross-correlation operation may be used, for example, to compare the digital image with a template.

BRIEF DESCRIPTION OF THE DRAWINGS/FIGURES

FIGS. 9A through 9C illustrate an example of a matrix convolved with another matrix.

FIGS. 10A through 10C illustrate as example of a matrix convolved with another matrix using clamped values.

FIGS. 11A through 11C illustrate an example of a matrix convolved with another matrix using mirrored values.

FIGS. 12A through 12C illustrate an example of a matrix cross correlated with another matrix using clamped values.

DETAILED DESCRIPTION

Figure 1:
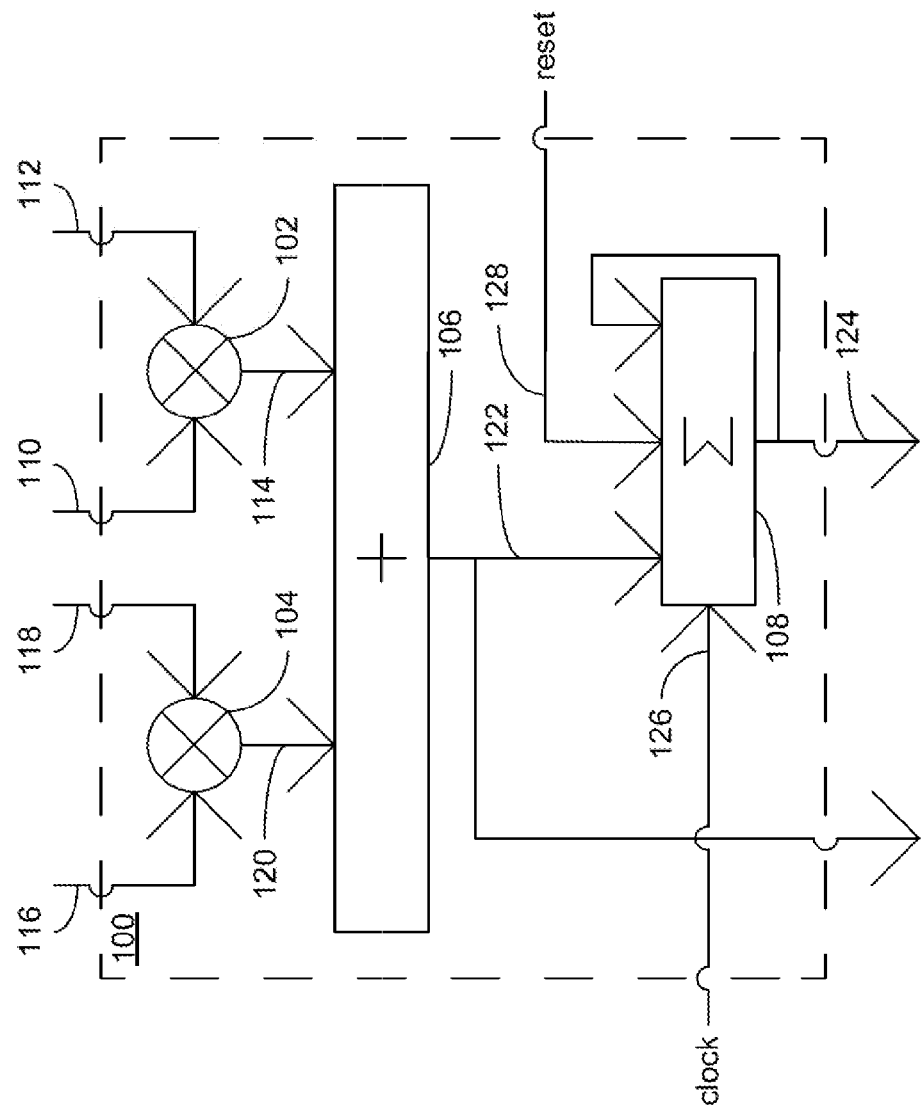
FIGS. 1 and 2 are block diagrams of example subsystems for performing mathematical operations, according to embodiments.

An embodiment is now described with reference to the figures, where like reference numbers indicate identical or functionally similar elements. While specific configurations and arrangements are discussed, it should be understood that this is done for illustrative purposes only. One of skill in the art will recognize that other configurations and arrangements may be used without departing from the spirit and scope of the description. It will be apparent to one of skill in the art that this may also be employed in a variety of other systems and applications other than what is described herein.

Disclosed herein are systems, methods, and computer program products for performing mathematical functions.

In video analytics and image processing, processing may mostly be done in fixed point, rather than floating point, and the input and output required may be fixed point. Embodiments described herein may include an efficient, fixed point solution to many of the basic functions used predominantly in video analytics and image processing. Embodiments described herein may use the same hardware as a common solution to solve many of these functions. Hence, embodiments described herein may provide a high rate of reuse and an efficient design for implementing a hardware primitive as a solution for many of these functions. Embodiments described herein may also define a software interface to access these functions to be able to process them according to their requirements and to reconfigure the hardware for each function. Such functions may include, but are not limited to, convolution, matrix multiplication, cross correlation, calculations for determining a centroid, and image scaling.

A signal is a function that conveys information. Values of the abscissa of the function may change continuously or at discrete intervals. Likewise, values of the ordinate of the function may change continuously (analog) or at discrete intervals (digital). An image is a signal that conveys information in two dimensions. A digital image conveys information in two dimensions at discrete intervals through an array of picture elements, or pixels.

Mathematical operations may be used to process signals. In the case of a digital image, the discrete values of a function may be arranged in a matrix so that mathematical operations are performed with respect to the elements in the matrix. Mathematical operations may be used to process a digital image for a variety of reasons. For example, a convolution operation may be used for computer vision, statistics, and probability, and for image and signal processing for noise removal, feature enhancement, detail restoration, and for other purposes. A cross-correlation operation may be used, for example, to compare the digital image with a template.

Embodiments described herein may address an efficient hardware implementation of that may optimally calculate one dimensional horizontal, one dimensional vertical, and two dimensional convolution operations for various block levels and may optimally calculate a single element convolution. This may improve both performance and power efficiency in comparison with calculation convolution operations on programmable cores.

FIG. 1 is a block diagram of an example subsystem for performing mathematical operations, according to an embodiment. In FIG. 1, a subsystem 100 comprises a first multiplier 102, a second multiplier 104, an adder 106, and an accumulator 108.

First multiplier 102 may be configured to receive a first discrete value 110 and a second discrete value 112 and to produce a first product value 114. First and second discrete values 110 and 112 may be inputs of subsystem 100. First product value 114 may be a product of first discrete value 110 multiplied by second discrete value 112. Likewise, second multiplier 104 may be configured to receive a third discrete value 116 and a fourth discrete value 118 and to produce a second product value 120. Third and fourth discrete values 116 and 118 may be inputs of subsystem 100. Second product value 120 may be a product of third discrete value 116 multiplied by fourth discrete value 118. Adder 106 may be configured to receive first and second product values 114 and 120 and to produce a sum value 122. Sum value 122 may be a sum of first product value 114 added to second product value 120. Sum value 122 may be an output of subsystem 100.

One of skill in the art recognizes that subsystem 100 may further comprise additional multipliers (not shown) in which each additional multiplier may be configured to receive two discrete values and to produce a product value that is the product of the first of the two discrete values multiplied by the second of the two discrete values. Each product value may be received by adder 106, which may add all of its received product values to produce sum value 122.

Accumulator 108 may be configured to receive sum value 122 and to produce an accumulative value 124. Accumulator 108 may be configured to receive a clock signal 126 and a reset signal 128. Clock and reset signals 126 and 128 may be inputs of subsystem 100. Prior to performing a mathematical operation, accumulator 108 may receive reset signal 128 so that accumulative value 124 may be set equal to zero. Thereafter, with each cycle of clock signal 126, subsystem 100 may receive new first, second, third, and fourth discrete values 110, 112, 116, and 118, and accumulator 108 may receive a new sum value 122 and may add it to an existing accumulative value 124 to produce a new accumulative value 124, which may become the existing accumulative value 124 for the next cycle of clock signal 126. Accumulative value 124 may be an output of subsystem 100.

Figure 2:
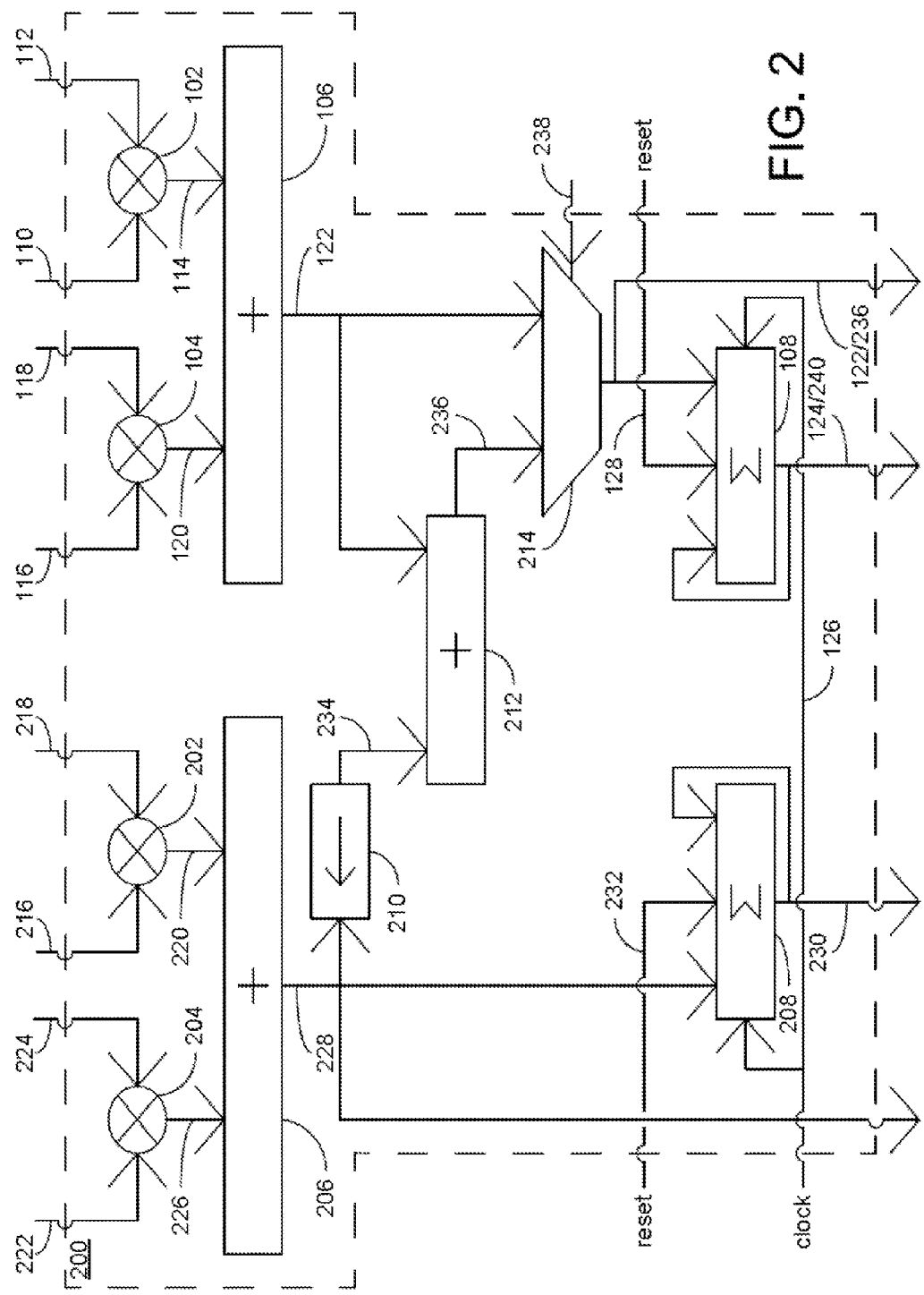
Figure 3:
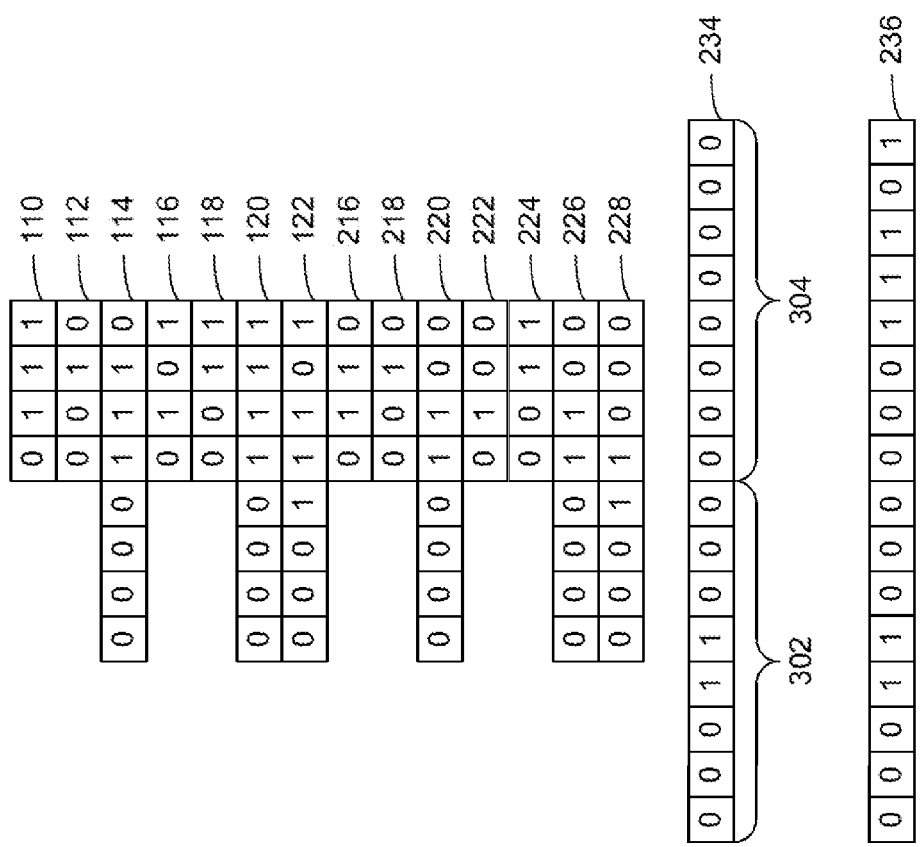
FIG. 3 illustrates examples of discrete values in binary form.

FIG. 2 is a block diagram of an example subsystem for performing mathematical operations, according to an embodiment. FIG. 3 illustrates examples of discrete values in binary form. In FIG. 2, a subsystem 200 comprises first multiplier 102, second multiplier 104, a third multiplier 202, a fourth multiplier 204, first adder 106, a second adder 206, first accumulator 108, a second accumulator 208, a bit shifter 210, a third adder 212, and a multiplexer 214.

First multiplier 102 may be configured to receive first discrete value 110 and second discrete value 112 and to produce first product value 114. First and second discrete values 110 and 112 may be inputs of subsystem 200. First product value 114 may be a product of first discrete value 110 multiplied by second discrete value 112. For example, with reference to FIGS. 2 and 3, first product value 114, binary 1110 (decimal 14), is a product of first discrete value 110, binary 111 (decimal 7), multiplied by second discrete value 112, binary 10 (decimal 2). Returning to FIG. 2, second multiplier 104 may be configured to receive third discrete value 116 and fourth discrete value 118 and to produce second product value 120. Third and fourth discrete values 116 and 118 may be inputs of subsystem 200. Second product value 120 may be a product of third discrete value 116 multiplied by fourth discrete value 118. For example, with reference to FIGS. 2 and 3, second product value 120, binary 1111 (decimal 15), is a product of third discrete value 116, binary 101 (decimal 5), multiplied by fourth discrete value 118, binary 11 (decimal 3). Returning to FIG. 2, first adder 106 may be configured to receive first and second product values 114 and 120 and to produce first sum value 122. First sum value 122 may be a sum of first product value 114 added to second product value 120. First sum value 122 may be an output of subsystem 200. For example, with reference to FIGS. 2 and 3, first sum value 122, binary 11101 (decimal 29), is a sum of first product value 114, binary 1110 (decimal 14), added to second product value 120, binary 1111 (decimal 15).

Returning to FIG. 2, third multiplier 202 may be configured to receive a fifth discrete value 216 and a sixth discrete value 218 and to produce a third product value 220. Fifth and sixth discrete values 216 and 218 may be inputs of subsystem 200. Third product value 220 may be a product of fifth discrete value 216 multiplied by sixth discrete value 218. For example, with reference to FIGS. 2 and 3, third product value 220, binary 1100 (decimal 12), is a product of fifth discrete value 216, binary 110 (decimal 6), multiplied by sixth discrete value 218, binary 10 (decimal 2). Returning to FIG. 2, fourth multiplier 204 may be configured to receive a seventh discrete value 222 and an eighth discrete value 224 and to produce a fourth product value 226. Seventh and eighth discrete values 222 and 224 may be inputs of subsystem 200. Fourth product value 226 may be a product of seventh discrete value 222 multiplied by eighth discrete value 224. For example, with reference to FIGS. 2 and 3, fourth product value 226, binary 1100 (decimal 12), is a product of seventh discrete value 222, binary 100 (decimal 4), multiplied by eighth discrete value 224, binary 11 (decimal 3). Returning to FIG. 2, second adder 206 may be configured to receive third and fourth product values 220 and 226 and to produce a second sum value 228. Second sum value 228 may be a sum of third product value 220 added to fourth product value 226. Second sum value 228 may be an output of subsystem 200. For example, with reference to FIGS. 2 and 3, second sum value 228, binary 11000 (decimal 24), is a sum of third product value 220, binary 1100 (decimal 12), added to fourth product value 226, binary 1100 (decimal 12).

Returning to FIG. 2, one of skill in the art recognizes that subsystem 200 may further comprise additional multipliers (not shown) in which each additional multiplier may be configured to receive two discrete values and to produce a product value that is the product of the first of the two discrete values multiplied by the second of the two discrete values. Each product value may be received by first or second adder 106 or 206, each of which may add all of its received product values to produce first or second sum value 122 or 228.

Bit shifter 210 may be configured to receive second sum value 228 and to produce a bit-shifted second sum value 234. Returning to FIG. 3, second sum value 228 may be represented by a first number of bits and bit-shifted second sum value 234 may be represented by a second number of bits. In FIG. 3, as an example and not as a limitation, the first number of bits may be eight and the second number of bits may be sixteen. One of skill in the art recognizes that these are example numbers of bits used to illustrate the operation of bit shifter 210 and that the second number of bits does not have to be double the first number of bits. A left-most portion of bits 302 in bit-shifted second sum value 234 may be equal to second sum value 228 while each bit of a right-most portion of bits 304 in bit-shifted second sum value 234 may be equal to zero. For example, left-most portion of bits 302 in bit-shifted second sum value 234 is equal to second sum value 228, binary 11000 (decimal 24), while each bit of a right-most portion of bits 304 in bit-shifted second sum value 234 is equal to zero. As a result, bit-shifted second sum value 234 is equal to binary 1100000000000 (decimal 6,144).

Returning to FIG. 2, third adder 212 may be configured to receive first sum value 122 and bit-shifted second sum value 234 and to produce a third sum value 236. Third sum value 236 may be a sum of first sum value 122 added to bit-shifted second sum value 234. Third sum value 236 may be an output of subsystem 200. For example, with reference to FIGS. 2 and 3, third sum value 236, binary 1100000011101 (decimal 6,173), is a sum of first sum value 122, binary 11101 (decimal 29), added to bit-shifted second sum value 234, binary 1100000000000 (decimal 6,144).

Returning to FIG. 2, multiplexer 214 may be configured to receive first sum value 122 and third sum value 236 and to produce first or third sum value 122 or 236. Multiplexer 214 may be configured to receive a selector signal 238, which may determine whether multiplexer 214 is configured to produce first sum value 122 or is configured to produce third sum value 236. Selector signal 238 may be an input of subsystem 200.

First accumulator 108 may be configured to receive first sum value 122 or third sum value 236 and to produce, respectively, first accumulative value 124 or a third accumulative value 240. First accumulator 108 may be configured to receive clock signal 126 and first reset signal 128. Clock and first reset signals 126 and 128 may be inputs of subsystem 200. Prior to performing a mathematical operation, first accumulator 108 may receive first reset signal 128 so that first or third accumulative value 124 or 240 may be set equal to zero. Thereafter, with each cycle of clock signal 126, subsystem 200 may receive new first, second, third, and fourth discrete values 110, 112, 116, and 118, and first accumulator 108 may receive a new first or third sum value 122 or 236 and may add it to an existing first or third accumulative value 124 or 240 to produce a new first or third accumulative value 124 or 240, which may become the existing first or third accumulative value 124 or 240 for the next cycle of clock signal 126. First or third accumulative value 124 or 240 may be an output of subsystem 200.

Second accumulator 208 may be configured to receive second sum value 228 and to produce a second accumulative value 230. Second accumulator 208 may be configured to receive clock signal 126 and a second reset signal 232. Clock and second reset signals 126 and 232 may be inputs of subsystem 200. Prior to performing a mathematical operation, second accumulator 208 may receive second reset signal 232 so that second accumulative value 230 may be set equal to zero. Thereafter, with each cycle of clock signal 126, subsystem 200 may receive fifth, sixth, seventh, and eighth discrete values 216, 218, 222, and 224, and second accumulator 208 may receive a new second sum value 228 and may add it to an existing second accumulative value 230 to produce a new second accumulative value 230, which may become the existing second accumulative value 230 for the next cycle of clock signal 126. Second accumulative value 230 may be an output of subsystem 200.

Bit shifter 210, third adder 212, and multiplexer 214 may enable subsystem 200 to operate in two different modes: (1) a parallel operations mode and (2) a large number of bits mode. In the parallel operations mode, selector signal 238 may configure multiplexer 214 to produce first sum value 122. In the parallel operations mode, the collection of first multiplier 102, second multiplier 104, first adder 106, and first accumulator 108 may operate in parallel with and independent of the collection of third multiplier 202, fourth multiplier 204, second adder 206, and second accumulator 208.

For example, with reference to FIGS. 2 and 3, first product value 114, binary 1110 (decimal 14), is a product of first discrete value 110, binary 111 (decimal 7), multiplied by second discrete value 112, binary 10 (decimal 2). Second product value 120, binary 1111 (decimal 15), is a product of third discrete value 116, binary 101 (decimal 5), multiplied by fourth discrete value 118, binary 11 (decimal 3). First sum value 122, binary 11101 (decimal 29), is a sum of first product value 114, binary 110 (decimal 14), added to second product value 120, binary 1111 (decimal 15).

Likewise, in parallel with and independent of these operations, third product value 220, binary 1100 (decimal 12), is a product of fifth discrete value 216, binary 110 (decimal 6), multiplied by sixth discrete value 218, binary 10 (decimal 2). Fourth product value 226, binary 1100 (decimal 12), is a product of seventh discrete value 222, binary 100 (decimal 4), multiplied by eighth discrete value 224, binary 11 (decimal 3). Second sum value 228, binary 11000 (decimal 24), is a sum of third product value 220, binary 1100 (decimal 12), added to fourth product value 226, binary 1100 (decimal 12).

Returning to FIG. 2, in the large number of bits mode, selector signal 238 may configure multiplexer 214 to produce third sum value 236. In the large number of bits mode, bit shifter 210 and third adder 212 may configure subsystem 200 to perform mathematical operations on numbers represented by a large number of bits by exploiting: (1) the distributive property of multiplication: $(a+b) \times c = (a \times c) + (b \times c)$ and (2) the associative property of addition: $(d+e)+(f+g) = (d+f)+(e+g)$.

With respect to the distributive property of multiplication, because binary 11000000111 (decimal 1,543), for example, is equal to the sum of binary 11000000000 (decimal 1,536) added to binary 111 (decimal 7), multiplying binary 11000000111 (decimal 1,543) by binary 10 (decimal 2) is equal to the sum of the product of multiplying binary 11000000000 (decimal 1,536) by binary 10 (decimal 2) added to the product of multiplying binary 111 (decimal 7) by binary 10 (decimal 2). Likewise, because binary 10000000101 (decimal 1,029), for example, is equal to the sum of binary 10000000000 (decimal 1,024) added to binary 101 (decimal 5), multiplying binary 10000000101 (decimal 1,029) by binary 11 (decimal 3) is equal to the sum of the product of multiplying binary 10000000000 (decimal 1,024) by binary 11 (decimal 3) added to the product of multiplying binary 101 (decimal 5) by binary 11 (decimal 3).

Subsystem 200 may be configured, for example, to add the product of binary 11000000111 (decimal 1,543) multiplied by binary 10 (decimal 2) to the product of binary 10000000101 (decimal 1,029) multiplied by binary 11 (decimal 3). For example, with reference to FIGS. 2 and 3, first discrete value 110 is binary 111 (decimal 7), which is a right-most portion of bits of binary 11000000111 (decimal 1,543). Fifth discrete value 216 is binary 110 (decimal 6), which is a left-most portion of bits of binary 11000000111 (decimal 1,543) (assuming an 8 bit shift). Each of second and sixth discrete values 112 and 218 is binary 10 (decimal 2). Likewise, third discrete value 116 is binary 101 (decimal 5), which is a right-most portion of bits of binary 10000000101 (decimal 1,029). Seventh discrete value 222 is binary 100 (decimal 4), which is a left-most portion of bits of binary 10000000101 (decimal 1,029). Each of fourth and eighth discrete values 118 and 224 is binary 11 (decimal 3).

Rather than: (1) shifting the bits of third product value 220 so that binary 1100 (decimal 12) becomes binary 110000000000 (decimal 3,072) and adding the bit-shifted third product value to first product value 114, binary 1110 (decimal 14), for a sum of binary 110000001110 (decimal 3,086), (2) shifting the bits of fourth product value 226 so that binary 1100 (decimal 12) becomes binary 110000000000 (decimal 3,072) and adding the bit-shifted fourth product value to second product value 120, binary 1111 (decimal 15), for a sum of binary 110000001111 (decimal 3,087), and (3) adding binary 110000001110 (decimal 3,086) to binary 110000001111 (decimal 3.087) for a sum of binary 1100000011101 (decimal 6,173), instead subsystem 200 may be configured to exploit the associative property of addition by: (1) adding first product value 114, binary 1110 (decimal 14), to second product value 120, binary 1111 (decimal 15), to produce first sum value 122, binary 11101 (decimal 29), (2) adding third product value 220, binary 1100 (decimal 12), to fourth product value 226, binary 1100 (decimal 12), to produce second sum value 228, binary 11000 (decimal 24), (3) shifting the bits of second sum value 228 so that binary 11000 (decimal 24) becomes bit-shifted second sum value 234, binary 1100000000000 (decimal 6,144), and (4) adding first sum value 122, binary 11101 (decimal 29), to bit-shifted second sum value 234, binary 1100000000000 (decimal 6,144), to produce third sum value 236, binary 1100000011101 (decimal 6,173).

By using bit shifter 210 and third adder 212, each of discrete values 110, 112, 116, 118, 216, 218, 222, and 224 may be represented by a small number of bits. One of skill in the art recognizes that having each of discrete values 110, 112, 116, 118, 216, 218, 222, and 224 represented by a small number of bits advantageously limits an amount of layout area consumed by each of the multipliers 102, 104, 202, and 204.

Although the examples described above have demonstrated how subsystem 100 or 200 may be used to perform mathematical operations on numbers symbolized by a simple binary format, one of skill in the art recognizes that subsystem 100 or 200 may also be used to perform mathematical operations on numbers symbolized by more complex binary formats in which negative and fixed point fractional values may be represented. Such binary formats may include, but are not limited to, s3.12 format. Furthermore, other components (not shown) in subsystem 100 or 200 may be used round a result of a mathematical operation down to the nearest integer (i.e., floor) or up to the nearest integer (i.e., ceiling). One of skill in the art recognizes that having a large number of bits with which to represent discrete values is not only important where discrete values have large magnitudes, but also where a high degree of precision is needed in representing discrete values. One of skill in the art understands how to modify the teachings described above to use bit shifter 210 to realize these other important reasons for representing discrete values with a large number of bits.

Figure 4:
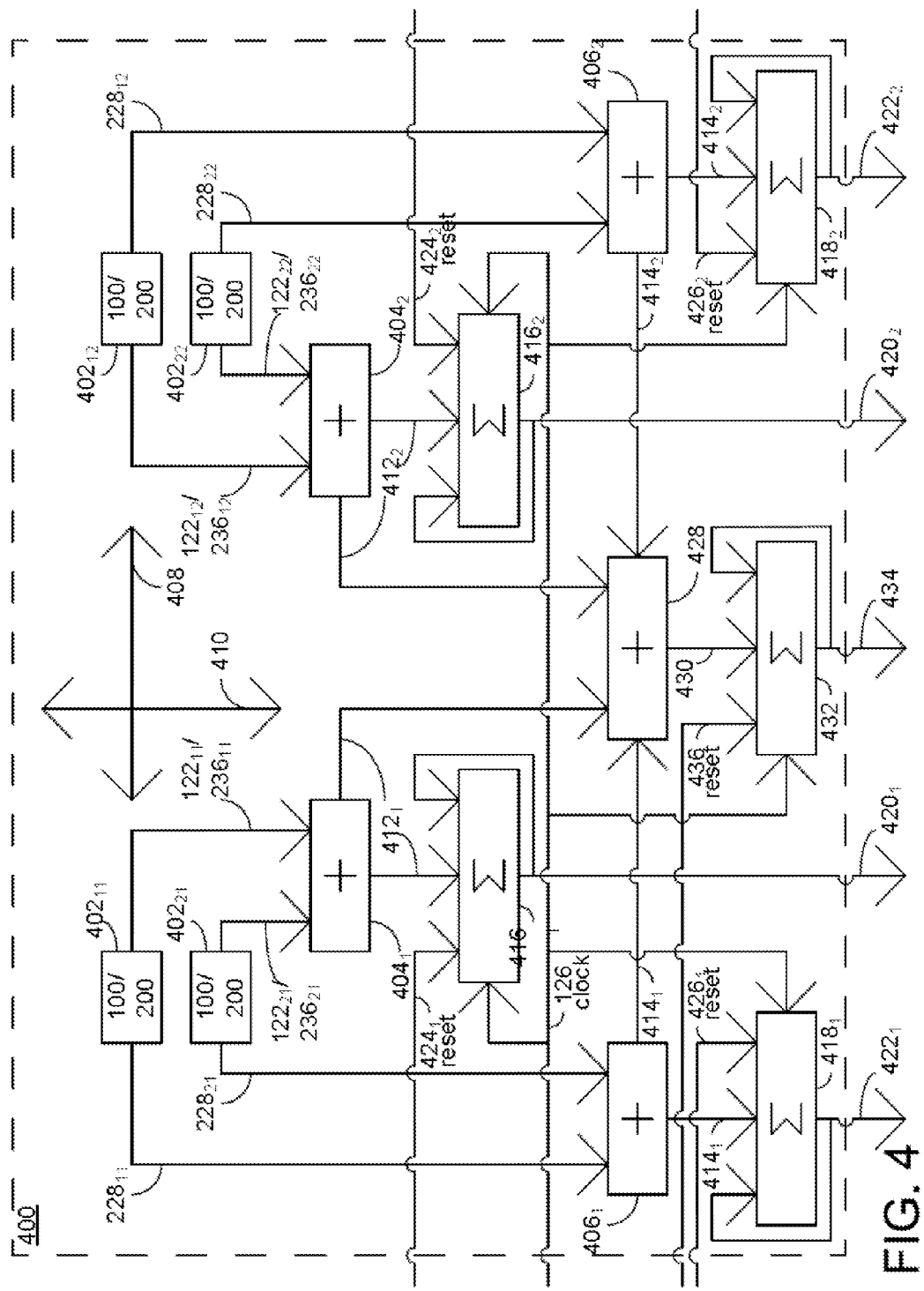
FIG. 4 is a block diagram of an example system for performing mathematical operations, according to an embodiment.

FIG. 4 is a block diagram of an example system for performing mathematical operations, according to an embodiment. In FIG. 4, a system 400 comprises an array of subsystems $402_{11}$, $402_{12}$, $402_{21}$, and $402_{22}$, a first large number of bits adder $404_1$, a second large number of bits adder $404_2$, a first small number of bits adder $406_1$, and a second small number of bits adder $406_2$.

Subsystems $402_{11}$, $402_{12}$, $402_{21}$, and $402_{22}$ may be coupled to perform mathematical operations on discrete values of functions arranged in matrices. Accordingly, subsystems $402_{11}$, $402_{12}$, $402_{21}$, and $402_{22}$ may be coupled to simulate physical positions along a first dimension 408 and a second dimension 410. For example, subsystem $402_{11}$ may be configured to simulate a first position from the left along first dimension 408 and a first position from the top along second dimension 410. Subsystem $402_{12}$ may be configured to simulate a second position from the left along first dimension 408 and a first position from the top along second dimension 410. Subsystem $402_{21}$ may be configured to simulate a first position from the left along first dimension 408 and a second position from the top along second dimension 410. Subsystem $402_{22}$ may be configured to simulate a second position from the left along first dimension 408 and a second position from the top along second dimension 410. Each of subsystems $402_{11}$, $402_{12}$, $402_{21}$, and $402_{22}$ may be realized as subsystem 100 or subsystem 200. Accordingly, the inputs and outputs of subsystem 100 or 200 may also be inputs and outputs of system 400.

First large number of bits adder $404_1$ may be configured to receive, from subsystem $402_{11}$, first sum value $122_{11}$ (if subsystem $402_{11}$ is realized as subsystem 100 or is operating in parallel operations mode) or third sum value $236_{11}$ (if subsystem $402_{11}$ is operating in large number of bits mode), to receive, from subsystem $402_{21}$, first sum value $122_{21}$ (if subsystem $402_{21}$ is realized as subsystem 100 or is operating in parallel operations mode) or third sum value $236_{21}$ (if subsystem $402_{21}$ is operating in large number of bits mode), and to produce a first large number of bits adder sum value $412_1$. First large number of bits adder sum value $412_1$ is a sum of first sum value $122_{11}$ (if subsystem $402_{11}$ is realized as subsystem 100 or is operating in parallel operations mode) or third sum value $236_{11}$ (if subsystem $402_{11}$ is operating in large number of bits mode) added to first sum value $122_{21}$ (if subsystem $402_{21}$ is realized as subsystem 100 or is operating in parallel operations mode) or third sum value $236_{21}$ (if subsystem $402_{21}$ is operating in large number of bits mode).

Likewise, second large number of bits adder $404_2$ may be configured to receive, from subsystem $402_{12}$, first sum value $122_{12}$ (if subsystem $402_{12}$ is realized as subsystem 100 or is operating in parallel operations mode) or third sum value $236_{12}$ (if subsystem $402_{12}$ is operating in large number of bits mode), to receive, from subsystem $402_{22}$, first sum value $122_{22}$ (if subsystem $402_{22}$ is realized as subsystem 100 or is operating in parallel operations mode) or third sum value $236_{22}$ (if subsystem $402_{22}$ is operating in large number of bits mode), and to produce a second large number of bits adder sum value $412_2$. Second large number of bits adder sum value $412_2$ is a sum of first sum value $122_{12}$ (if subsystem $402_{12}$ is realized as subsystem 100 or is operating in parallel operations mode) or third sum value $236_{12}$ (if subsystem $402_{12}$ is operating in large number of bits mode) added to first sum value $122_{22}$ (if subsystem $402_{22}$ is realized as subsystem 100 or is operating in parallel operations mode) or third sum value $236_{22}$ (if subsystem $402_{22}$ is operating in large number of bits mode).

Similarly, first small number of bits adder $406_1$ may be configured to receive, from subsystem $402_{11}$, second sum value $228_{11}$ (if subsystem $402_{11}$ is realized as subsystem 200), to receive, from subsystem $402_{21}$, second sum value $228_{21}$ (if subsystem $402_{21}$ is realized as subsystem 200), and to produce a first small number of bits adder sum value $414_1$. First small number of bits adder sum value $414_1$ is a sum of second sum value $228_1$, added to second sum value $228_{21}$.

Additionally, second small number of bits adder $406_2$ may be configured to receive, from subsystem $402_{12}$, second sum value $228_{12}$ (if subsystem $402_{12}$ is realized as subsystem 200), to receive, from subsystem $402_{22}$, second sum value $228_{22}$ (if subsystem $402_{22}$ is realized as subsystem 200), and to produce a first small number of bits adder sum value $414_2$. First small number of bits adder sum value $414_2$ is a sum of second sum value $228_{12}$ added to second sum value $228_{22}$.

Optionally, system 400 may further comprise a first large number of bits accumulator $416_1$, a second large number of bits accumulator $416_2$, a first small number of bits accumulator $418_1$, and a second small number of bits accumulator $418_2$.

First large number of bits accumulator $416_1$ may be configured to receive first large number of bits adder sum value $412_1$ and to produce a first large number of bits accumulator accumulative value $420_1$. First large number of bits accumulator $416_1$ may be configured to receive clock signal 126 and a first large number of bits accumulator reset signal $424_1$. Clock and first large number of bits accumulator reset signals 126 and $424_1$ may be inputs of system 400. Prior to performing a mathematical operation, first large number of bits accumulator $416_1$ may receive first large number of bits accumulator reset signal $424_1$ so that first large number of bits accumulator accumulative value $420_1$ may be set equal to zero. Thereafter, with each cycle of clock signal 126, first large number of bits accumulator $416_1$ may receive a new first large number of bits adder sum value $412_1$ and may add it to an existing first large number of bits accumulator accumulative value $420_s$ to produce a new first large number of bits accumulator accumulative value $420_1$, which may become the existing first large number of bits accumulator accumulative value $420_1$ for the next cycle of clock signal 126. First large number of bits accumulator accumulative value $420_1$ may be an output of system 400.

Likewise, second large number of bits accumulator $416_2$ may be configured to receive second large number of bits adder sum value $412_2$ and to produce a second large number of bits accumulator accumulative value $420_2$. Second large number of bits accumulator $416_2$ may be configured to receive clock signal 126 and a second large number of bits accumulator reset signal $424_2$. Second large number of bits accumulator reset signal $424_2$ may be an input of system 400. Prior to performing a mathematical operation, second large number of bits accumulator $416_2$ may receive second large number of bits accumulator reset signal $424_2$ so that second large number of bits accumulator accumulative value $420_2$ may be set equal to zero. Thereafter, with each cycle of clock signal 126, second large number of bits accumulator $416_2$ may receive a new second large number of bits adder sum value $412_2$ and may add it to an existing second large number of bits accumulator accumulative value $420_2$ to produce a new second large number of bits accumulator accumulative value $420_2$, which may become the existing second large number of bits accumulator accumulative value $420_2$ for the next cycle of clock signal 126. Second large number of bits accumulator accumulative value $420_2$ may be an output of system 400.

Similarly, first small number of bits accumulator $418_1$ may be configured to receive first small number of bits adder sum value $414_1$ and to produce a first small number of bits accumulator accumulative value $422_1$. First small number of bits accumulator $418_1$ may be configured to receive clock signal 126 and a first small number of bits accumulator reset signal $426_1$. First small number of bits accumulator reset signal $426_1$ may be an input of system 400. Prior to performing a mathematical operation, first small number of bits accumulator $418_1$ may receive first small number of bits accumulator reset signal $426_1$ so that first small number of bits accumulator accumulative value $422_1$ may be set equal to zero. Thereafter, with each cycle of clock signal 126, first small number of bits accumulator $418_1$ may receive a new first small number of bits adder sum value $414_1$ and may add it to an existing first small number of bits accumulator accumulative value $422_1$ to produce a new first small number of bits accumulator accumulative value $422_1$, which may become the existing first small number of bits accumulator accumulative value $422_1$ for the next cycle of clock signal 126. First small number of bits accumulator accumulative value $422_1$ may be an output of system 400.

Additionally, second small number of bits accumulator $418_2$ may be configured to receive second small number of bits adder sum value $414_2$ and to produce a second small number of bits accumulator accumulative value $422_2$. Second small number of bits accumulator $418_2$ may be configured to receive clock signal 126 and a second small number of bits accumulator reset signal $426_2$. Second small number of bits accumulator reset signal $426_2$ may be an input of system 400. Prior to performing a mathematical operation, second small number of bits accumulator $418_2$ may receive second small number of bits accumulator reset signal $426_2$ so that second small number of bits accumulator accumulative value $422_2$ may be set equal to zero. Thereafter, with each cycle of clock signal 126, second small number of bits accumulator $418_2$ may receive a new second small number of bits adder sum value $414_2$ and may add it to an existing second small number of bits accumulator accumulative value $422_2$ to produce a new second small number of bits accumulator accumulative value $422_2$, which may become the existing second small number of bits accumulator accumulative value $422_2$ for the next cycle of clock signal 126. Second small number of bits accumulator accumulative value $422_2$ may be an output of system 400.

Optionally, system 400 may further comprise a first dimension adder 428. First dimension adder 428 may be configured to receive first large number of bits adder sum value $412_1$, second large number of bits adder sum value $412_2$, first small number of bits adder sum value $414_1$, and second small number of bits adder sum value $414_2$, and to produce a first dimension adder sum value 430. First dimension adder sum value 430 is a sum of first large number of bits adder sum value $412_1$ added to second large number of bits adder sum value $412_2$ added to first small number of bits adder sum value $414_1$ added to second small number of bits adder sum value $414_2$.

If system 400 comprises first dimension adder 428, then optionally system 400 may further comprise a first dimension accumulator 432. First dimension accumulator 432 may be configured to receive first dimension adder sum value 430 and to produce a first dimension accumulator accumulative value 434. First dimension accumulator 432 may be configured to receive clock signal 126 and a first dimension accumulator reset signal 436. First dimension accumulator reset signal 436 may be an input of system 400. Prior to performing a mathematical operation, first dimension accumulator 432 may receive first dimension accumulator reset signal 436 so that first dimension accumulator accumulative value 434 may be set equal to zero. Thereafter, with each cycle of clock signal 126, first dimension accumulator 432 may receive a new first dimension adder sum value 434 and may add it to an existing first dimension accumulator accumulative value 434 to produce a new first dimension accumulator accumulative value 434, which may become the existing first dimension accumulator accumulative value 434 for the next cycle of clock signal 126. First dimension accumulator accumulative value 434 may be an output of system 400.

One of skill in the art recognizes that system 400 may further comprise additional subsystems 402 (not shown). In an embodiment, additional subsystems 402 (not shown) may be coupled to simulate physical positions along second dimension 410. In such an embodiment, each of first and second large number of bits adders $404_1$ and $404_2$ may be further configured to receive an additional first or third sum value 122 or 236 from a corresponding additional subsystem 402 (not shown) and each of first and second small number of bits adders $406_1$ and $406_2$ may be further configured to receive an additional second sum value 228 from the corresponding additional subsystem 402 (not shown).

In another embodiment, additional subsystems 402 (not shown) may be coupled to simulate physical positions along first dimension 408. In such an embodiment, system 400 may further comprise, for each additional subsystem 402 (not shown), a corresponding large number of bits adder 404 (not shown), to receive a corresponding first or third sum value 122 or 236, and a corresponding small number of bits adder 406 (not shown), to receive a corresponding second sum value 228. Optionally, system 400 may further comprise, for each additional large number of bits adder 404 (not shown), a corresponding large number of bits accumulator 416 (not shown), to receive a corresponding large number of bits adder sum value 412. Optionally, system 400 may further comprise, for each additional small number of bits adder 406 (not shown), a corresponding small number of bits accumulator 418 (not shown), to receive a corresponding small number of bits adder sum value 414. If system 400 comprises first dimension adder 428, then first dimension adder 428 may be further configured to receive, for each additional subsystem 402 (not shown), an additional large number of bits adder sum value 412 from a corresponding additional large number of bits adder 404 (not shown) and an additional small number of bits adder sum value 414 from a corresponding additional small number of bits adder 404 (not shown).

Figure 5:
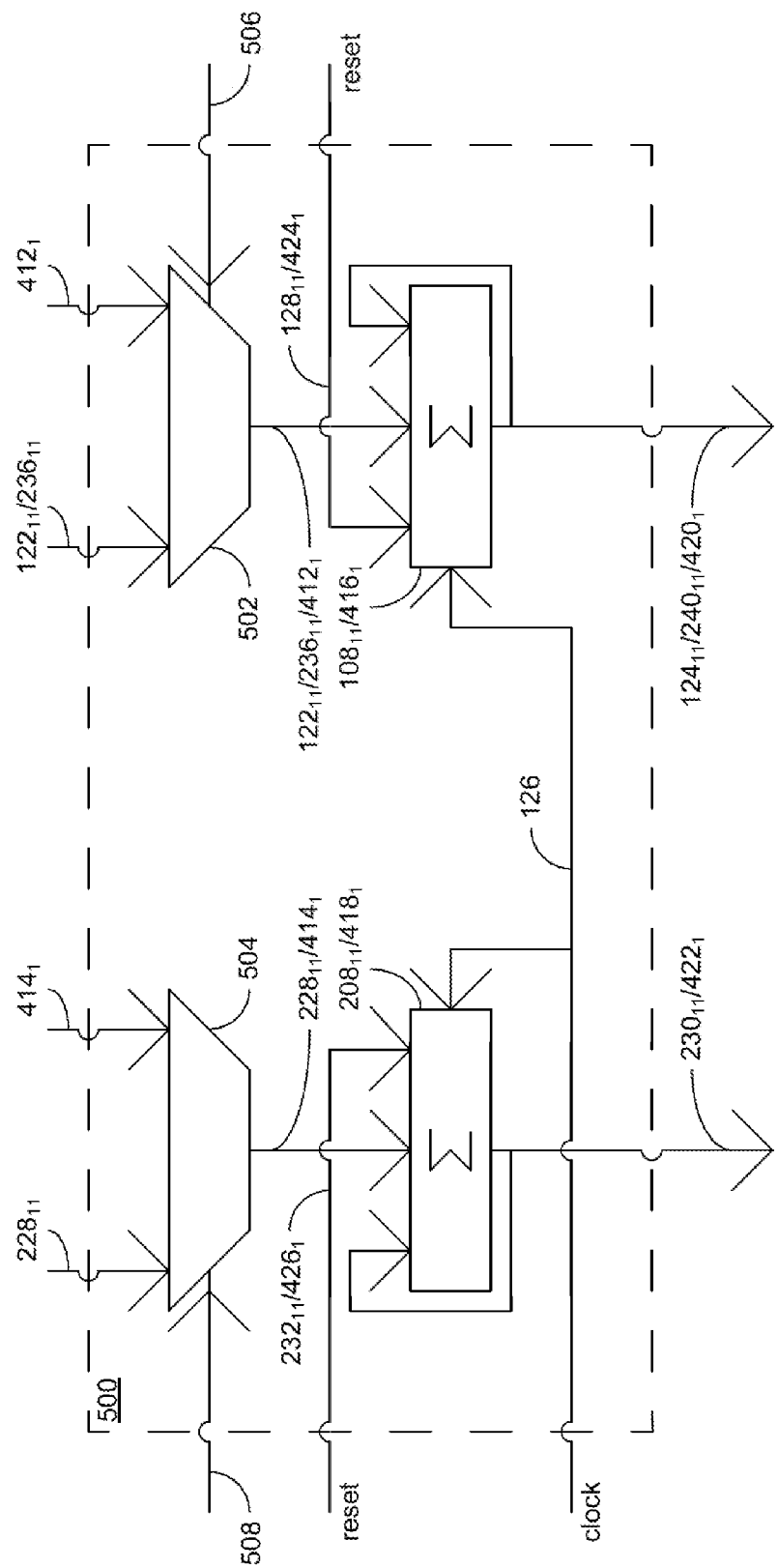
FIGS. 5 and 6 are block diagrams of example circuit variations for a system for performing mathematical operations, according to embodiments.

FIG. 5 is a block diagram of an example subsystem variation for a system for performing mathematical operations, according to an embodiment. One of skill in the art recognizes that it is advantageous to limit an amount of layout area consumed by a system. When a given function is needed at several points in a system, one way to limit the amount of layout area consumed by the system may be, rather than to locate, at each point in the system at which the given function needs to be performed, a component to perform the given function, instead to configure the system to route signals from a point in the system at which the given function needs to be performed to a component to perform the given function. In this manner, the number of components in the system, and consequently the layout area consumed by the system, may be reduced.

In FIG. 5, a subsystem 500 comprises a first accumulator $108_{11}/416_1$, a second accumulator $208_{11}/418_1$, a first multiplexer 502, and a second multiplexer 504. First accumulator $108_{11}/416_1$ may be a single component configured to perform the accumulator functions of first accumulator $108_{11}$ of subsystem 100 or 200 and first large number of bits accumulator $416_1$ of system 400. Likewise, second accumulator $208_{11}/418_1$ may be a single component configured to perform the accumulator functions of second accumulator $208_{11}$ of subsystem 200 and first small number of bits accumulator $418_1$ of system 400.

First multiplexer 502 may be configured to receive, from subsystem $402_{11}$, first sum value $122_{11}$ (if subsystem $402_{11}$ is realized as subsystem 100 or is operating in parallel operations mode) or third sum value $236_{11}$ (if subsystem $402_{11}$ is operating in large number of bits mode), to receive, from first large number of bits adder $404_1$, first large number of bits adder sum value $412_1$, and to produce first sum value $122_{11}$, third sum value $236_{11}$, or first large number of bits adder sum value $412_1$. First multiplexor 502 may be configured to receive a first selector signal 506, which may determine whether first multiplexer 502 is configured to produce first or third sum value $122_{11}$ or $236_{11}$ or is configured to produce first large number of bits adder sum value $412_1$. First or third sum value $122_{11}$ or $236_{11}$, first large number of bits adder sum value $412_1$, and first selector signal 506 may be inputs of subsystem 500.

Likewise, second multiplexer 504 may be configured to receive, from subsystem $402_{11}$, second sum value $228_{11}$ (if subsystem $402_{11}$ is realized as subsystem 200), to receive, from first small number of bits adder $406_1$, first small number of bits adder sum value $414_1$, and to produce second sum value $228n$ or first small number of bits adder sum value $414_1$. Second multiplexor 504 may be configured to receive a second selector signal 508, which may determine whether second multiplexer 504 is configured to produce second sum value $228_{11}$ or is configured to produce first small number of bits adder sum value $414_1$. Second sum value $228_{11}$, first small number of bits adder sum value $414_1$, and second selector signal 508 may be inputs of subsystem 500.

First accumulator $108_{11}/416_1$ may be configured to receive first sum value $122_{11}$, third sum value $236_{11}$, or first large number of bits adder sum value $412_1$ and to produce, respectively, first accumulative value $124_{11}$, third accumulative value $240_{11}$, or first large number of bits accumulator accumulative value $420_1$. First accumulator $108_{11}/416_1$ may be configured to receive clock signal 126 and a first reset signal $128_{11}/424_1$. First reset signal $128_{11}/424_1$ may be a combination of first reset signal $128_{11}$ of subsystem 100 or 200 and first large number of bits accumulator reset signal $424_1$ of system 400. Clock and first reset signals 126 and $128_{11}/424_1$ may be inputs of subsystem 500. Prior to performing a mathematical operation, first accumulator $108_{11}/416_1$ may receive first reset signal $128_{11}/424_1$ so that first or third accumulative value $124_{11}$ or $240_{11}$ or first large number of bits accumulator accumulative value $420_1$ may be set equal to zero. Thereafter, with each cycle of clock signal 126, first accumulator $108_{11}/416_1$ may receive a new first or third sum value $122_{11}$ or $236_{11}$ or first large number of bits adder sum value $412_1$ and may add it to an existing first or third accumulative value $124_{11}$ or $240_{11}$ or first large number of bits accumulator accumulative value $420_1$ to produce a new first or third accumulative value $124_{11}$ or $240_{11}$ or first large number of bits accumulator accumulative value $420_1$, which may become the existing first or third accumulative value $124_{11}$ or $240_{11}$ or first large number of bits accumulator accumulative value $420_1$ for the next cycle of clock signal 126. First accumulative value $124_{11}$, third accumulative value $240_{11}$, and first large number of bits accumulator accumulative value $420_1$ may be outputs of subsystem 500.

Likewise, second accumulator $208_{11}/418_1$ may be configured to receive second sum value $228_{11}$ or first small number of bits adder sum value $414_1$ and to produce, respectively, second accumulative value $230_{11}$ or first small number of bits accumulator accumulative value $422_1$. Second accumulator $208_{11}/418_1$ may be configured to receive clock signal 126 and a second reset signal $232_{11}/426_1$. Second reset signal $232_{11}/426_1$ may be a combination of second reset signal $232_{11}$ of subsystem 200 and first small number of bits accumulator reset signal $426_1$ of system 400. Second reset signal $232_{11}/426_1$ may be an input of subsystem 500. Prior to performing a mathematical operation, second accumulator $208_{11}/418_1$ may receive second reset signal $232_{11}/426_1$ so that second accumulative value $230_{11}$ or first small number of bits accumulator accumulative value $422_1$ may be set equal to zero. Thereafter, with each cycle of clock signal 126, second accumulator $208_{11}/418_1$ may receive a new second sum value $228_{11}$ or first small number of bits adder sum value $414_1$ and may add it to an existing second accumulative value $230_{11}$ or first small number of bits accumulator accumulative value $422_1$ to produce a new second accumulative value $230_{11}$ or first small number of bits accumulator accumulative value $422_1$, which may become the existing second accumulative value $230_{11}$ or first small number of bits accumulator accumulative value $422_1$ for the next cycle of clock signal 126. Second accumulative value $230_{11}$ and first small number of bits accumulator accumulative value $422_1$ may be outputs of subsystem 500.

One of skill in the art recognizes that although subsystem 500 as shown in FIG. 5 corresponds to the set of subsystem $402_{11}$, first large number of bits accumulator $416_1$, and first small number of bits accumulator $418_1$ of system 400 as shown in FIG. 4, additional subsystems 500 (not shown) may be included in system 400 so that each set of subsystem 402, large number of bits accumulator 416, and small number of bits accumulator 418 along first dimension 408 and at a given position in second dimension 410 includes a corresponding subsystem 500 (not shown). For example, the set of subsystem $402_{12}$, second large number of bits accumulator $416_2$, and second small number of bits accumulator $418_2$ may include a corresponding subsystem 500 (not shown).

One of skill in the art also recognizes that while there may be an advantage to having each set of subsystem 402, large number of bits accumulator 416, and small number of bits accumulator 418 along first dimension 408 at a given position in second dimension 410 include a corresponding subsystem 500 (not shown), there may not be an advantage to extending the inclusion of subsystem 500 (not shown) to other sets of subsystem 402, large number of bits accumulator 416, and small number of bits accumulator 418 at other positions in second dimension 410.

One of skill in the art further recognizes that although subsystem 500 as shown in FIG. 5 corresponds to subsystem $402_{11}$, first large number of bits accumulator $416_1$, and first small number of bits accumulator $418_1$ of system 400 as shown in FIG. 4, which is at the first position from the top in second dimension 410, the inclusion of subsystem 500 may have been at a different position from the top in second dimension 410. For example, in keeping with the advantage of having each set of subsystem 402, large number of bits accumulator 416, and small number of bits accumulator 418 along first dimension 408 at a given position in second dimension 410 include a corresponding subsystem 500 (not shown), rather than including a corresponding subsystem 500 in the set of subsystem $402_{11}$, first large number of bits accumulator $416_1$, and first small number of bits accumulator $418_1$ and a corresponding subsystem 500 (not shown) in the set of subsystem $402_{12}$, second large number of bits accumulator $416_2$, and second small number of bits accumulator $418_2$, system 400 may instead include a corresponding subsystem 500 (not shown) in the set of subsystem $402_{21}$, first large number of bits accumulator $416_1$, and first small number of bits accumulator $418_1$ and a corresponding subsystem 500 (not shown) in the set of subsystem $402_{22}$, second large number of bits accumulator $416_2$, and second small number of bits accumulator $418_2$.

Figure 6:
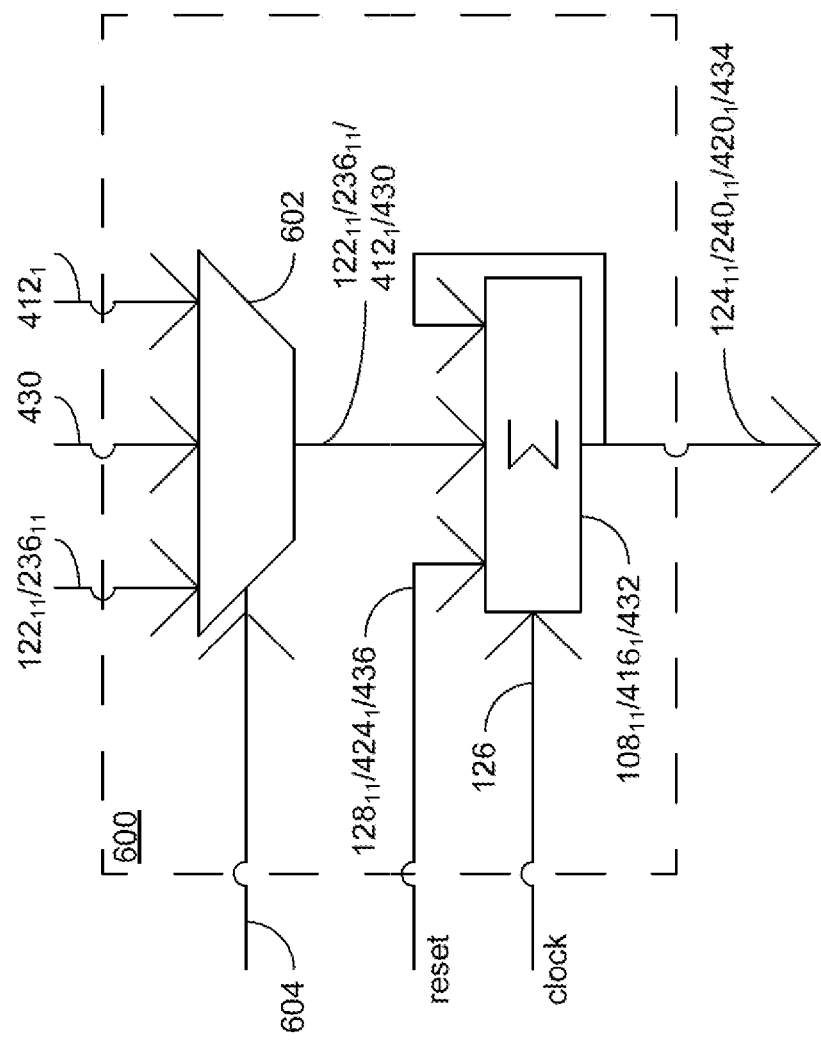

FIG. 6 is a block diagram of an example subsystem variation for a system for performing mathematical operations, according to an embodiment. One of skill in the art recognizes that it is advantageous to limit an amount of layout area consumed by a system. When a given function is needed at several points in a system, one way to limit the amount of layout area consumed by the system may be, rather than to locate, at each point in the system at which the given function needs to be performed, a component to perform the given function, instead to configure the system to route signals from a point in the system at which the given function needs to be performed to a component to perform the given function. In this manner, the number of components in the system, and consequently the layout area consumed by the system, may be reduced.

In FIG. 6, a subsystem 600 comprises an accumulator $108_{11}/416_1/432$ and a multiplexer 602. Accumulator $108_{11}/416_1/432$ may be a single component configured to perform the accumulator functions of second accumulator $108_{11}$ of subsystem 100 or 200, first small number of bits accumulator $416_1$ of system 400, and first dimension accumulator 432 of system 400.

Multiplexer 602 may be configured to receive, from subsystem $402_{11}$, first sum value $122_{11}$ (if subsystem $402_{11}$ is realized as subsystem 100 or is operating in parallel operations mode) or third sum value $236_{11}$ (if subsystem $402_{11}$ is operating in large number of bits mode), to receive, from first large number of bits adder $404_1$, first large number of bits adder sum value $412_1$, to receive, from first dimension adder 428, first dimension adder sum value 430, and to produce first sum value $122_{11}$, third sum value $236_{11}$, first large number of bits adder sum value $412_1$, or first dimension adder sum value 430. Multiplexer 602 may be configured to receive a selector signal 604, which may determine whether multiplexer 602 is configured to produce first or third sum value $122_{11}$ or $236_{11}$, is configured to produce first large number of bits adder sum value $412_1$ or is configured to produce first dimension adder sum value 430. First or third sum value $122_{11}$ or $236_{11}$, first large number of bits adder sum value $412_1$, first dimension adder sum value 430, and selector signal 604 may be inputs of subsystem 600.

Accumulator $108_{11}/416_1/432$ may be configured to receive first sum value $122_{11}$, third sum value $236_{11}$, first large number of bits adder sum value $412_1$, or first dimension adder sum value 430 and to produce, respectively, first accumulative value $124_{11}$, third accumulative value $240_{11}$, first large number of bits accumulator accumulative value $420_1$, or first dimension accumulator accumulative value 434. Accumulator $108_{11}/416_1/432$ may be configured to receive clock signal 126 and a reset signal $128_{11}/424_1/436$. Reset signal $128_{11}/42_1/436$ may be a combination of first reset signal $128_{11}$ of subsystem 100 or 200, first large number of bits accumulator reset signal $424_1$ of system 400, and first dimension accumulator reset signal 436 of system 400. Clock and reset signals 126 and $128_{11}/424_1/436$ may be inputs of subsystem 600. Prior to performing a mathematical operation, accumulator $108_{11}/416_1/432$ may receive reset signal $232_{11}/426_1/436$ so that first or third accumulative value $124_{11}$ or $240_{11}$, first large number of bits accumulator accumulative value $420_1$ or first dimension accumulator accumulative value 434 may be set equal to zero. Thereafter, with each cycle of clock signal 126, accumulator $108_{11}/416_1/432$ may receive a new first or third sum value $122_{11}$ or $236_{11}$, first large number of bits adder sum value $412_1$, or first dimension adder sum value 430 and may add it to an existing first or third accumulative value $124_{11}$ or $240_{11}$, first large number of bits accumulator accumulative value $420_1$, or first dimension accumulator accumulative value 434 to produce a new first or third accumulative value $124_{11}$ or $240_{11}$, first large number of bits accumulator accumulative value $420_1$, or first dimension accumulator accumulative value 434, which may become the existing first or third accumulative value $124_{11}$ or $240_{11}$, first large number of bits accumulator accumulative value $420_1$, or first dimension accumulator accumulative value 434 for the next cycle of clock signal 126. First accumulative value $124_{11}$, third accumulative value $240_{11}$, first large number of bits accumulator accumulative value $420_1$, and first dimension accumulator accumulative value 434 may be outputs of subsystem 600.

One of skill in the art recognizes that although subsystem 600 as shown in FIG. 6 corresponds to the set of subsystem $402_{11}$, first large number of bits accumulator $416_1$, and first small number of bits accumulator $418_1$ of system 400 as shown in FIG. 4, subsystem 600 may have been included in any set of subsystem 402, large number of bits accumulator 416, and small number of bits accumulator 418. For example, subsystem 600 (not shown) may have been included in the set of subsystem $402_{22}$, second large number of bits accumulator $416_2$, and second small number of bits accumulator $418_2$. One of skill in the art also recognizes that while there may be an advantage to having one set of subsystem 402, large number of bits accumulator 416, and small number of bits accumulator 418 include a corresponding subsystem 600 (not shown), there may not be an advantage to extending the inclusion of subsystem 600 (not shown) to other sets of subsystem 402, large number of bits accumulator 416, and small number of bits accumulator 418.

Figure 7:
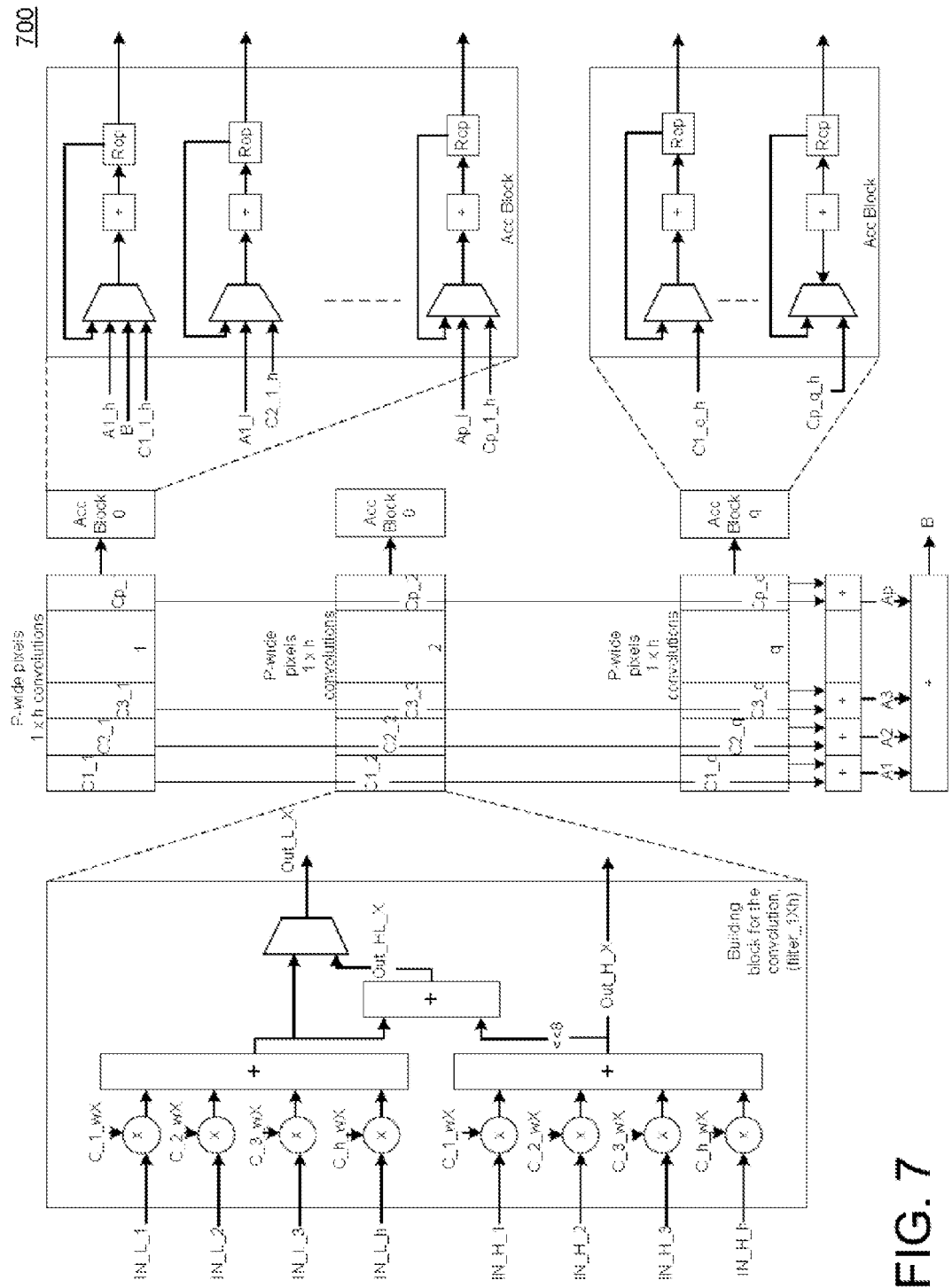
FIG. 7 is a block diagram of an example system for performing mathematical operations, according to an embodiment.

FIG. 7 is a block diagram of an example system for performing mathematical operations, according to an embodiment. In FIG. 7, a system 700 may include a hardware primitive that may include implementations of system 400 along with the variations of subsystems 100, 200, 500, or 600. In FIG. 7, system 700 may include implementations of subsystem 100 or 200, shown at the left, in which each of first and second adders 106 and 206 has "h" multipliers. These implementations of subsystem 100 or 200 may be a "building block filter" in an array having "p" rows and "q" columns. System 700 may also include an implementation of first dimension adder 428, shown at the bottom of FIG. 7, and implementations of large and small number of bits adders 404 and 406, shown directly above the implementation of first dimension adder 428. An implementation of subsystem 600 may also be included in system 700, shown at the top, right of FIG. 7, and implementations of subsystem 500, shown directly below the implementation of subsystem 600. In FIG. 7, system 700 may also include implementations of large and small number of bits accumulators 416 and 418, shown at the bottom, right. One of skill in the art recognizes that the arrangement of system 700 may allow the hardware primitive to be scaled to the size of the matrices upon which mathematical operations are performed.

One of skill in the art recognizes that system 700 may be implemented in a graphics processing unit to that the mathematical operations described herein may be performed at a higher rate in the graphics processing unit. System 700 may be implemented in the sampler. Alternatively, system 700 may be implemented in a standalone design and used as a hardware accelerator that is called by the processing elements.

System 700, as illustrated in FIG. 7, may be just one hardware primitive residing within a larger system. One of skill in the art recognizes that there may be multiple hardware primitives in such a larger system connected to multiple processing elements. Because there may be multiple hardware primitives and multiple processing elements in a multicore design, such as a multi-core central processing unit and/or graphics processing unit, that may be accessing the hardware primitive of system 700, one of skill in the art may include a reorder buffer (not shown) before each hardware primitive. Such a reorder buffer (not shown) may reorder commands received, depending upon the x- and y-coordinates, and arrange adjacent commands to be executed first to provide optimal reuse of the data from the data cache (not shown) that can support the hardware primitive. Such a reorder buffer (not shown) may enhance the performance of the larger system in which system 700 resides.

Because system 700 performs numerous multiplication and addition operations, maintaining precision during the process may be an important consideration. Intermediate calculations may be performed in full precision. Before the final result is output, it may be necessary to adjust the output, depending on the input coefficients and the output format required. The following pseudo code may be implemented at the final output to match the output format required.

Result=Clamp(round(Out>>(out_shift+coeff_prec)));

Where:
'Out' can be A[ ][ ] or A[ ] or 'B' depending on the above block size
Coeff_prec is the decimal position in the fixed point coefficient (for s3.12, coeff_prec=12)
Round( ) function is dependent upon 'round to nearest integer' or 'round to even', etc.
Clamp( ) depends on the output format—either 16b/32b/64b integer value
Result can be signed 16b/32b/64b depending on requirements.
Out_shift depends on the coefficient precision and how coefficients are scaled up and fed to the hardware primitive as explained below in the paragraph following the description of the software interface that may be used to support calculating two dimensional, one dimensional, and single element convolutions.

Additional pseudo code is provided below in conjunction with the specific mathematical operations to be supported. However, because the building block filter is fundamental to each of the mathematical operations, pseudo code that may support the building block filter is presented now. One of skill in the art recognizes that where h equals the number of multipliers 102/202. 104/204, etc. per adder 106/206; p equals the number of subsystems 402 along first dimension 408; and q equals the number of subsystems 402 along second dimension 410, that C_1×h[ ] may be one set of inputs for multipliers 102/202, 104/204, etc.; IN_1×h[ ] may be another set of inputs for multipliers 102/202, 104/204, etc.; Out_L_X may be first or third sum value 122 or 236; and Out_H_X may be second sum value 228 for the following pseudo code:

h = h-tap in y-direction
1×h = h-tap filter
C_1×h[ ] is 1D coefficient matrix in s3.12 format
In_1×h[ ] is the 1D input image to be convolved which can be 16-bit UINT/SINT or two 8-bit pixels
Out_L_X is output for 16-bit input format (or) even pixels in 8-bit input format for 1×h convolution
Out_H_X is output for odd pixels in 8-bit input format for 1×h convolution; ignored for 16-bit format

```
ind16 - if 1, the input format is 16-bit; else, it is 8-bit
ind16s - if 1, the input format is 16-bit signed else, it is 16-bit unsigned
    (used only when ind16 is 1; 8-bit input is always unsigned)
    filter_1xh(IN_1xh, C_1xh, Out_L_X, Out_H_X)
    {
      Sign = ind16 ? (ind16s ? IN_1xh[15] : 0) : 0
      For (k = 0; k < h; k++)
      {
        IN_L[k] = {0, IN_1xh[k][7:0]} //[7:0] represent lower 8 bits of 16 bit
IN_1xh[k]
        IN_H[k] = {Sign, IN_1xh[k][15:8]} //[15:8] represent upper 8 bits of 16 bit
IN_1xh[k]
        internal_L_X =+ IN_L[k] * C[k]
        internal_H_X =+ IN_H[k] * C[k]
      }
      If(ind 16) {
        Out_L_X = internal_L_X + (internal_H_X << 8)
        Out_H_X = internal_H_X // Not used for 16 bit case
      }
      Else {
        Out_L_X = internal_L_X
        Out_H_X = internal_H_X
      }
    }
}
```

Figure 8:
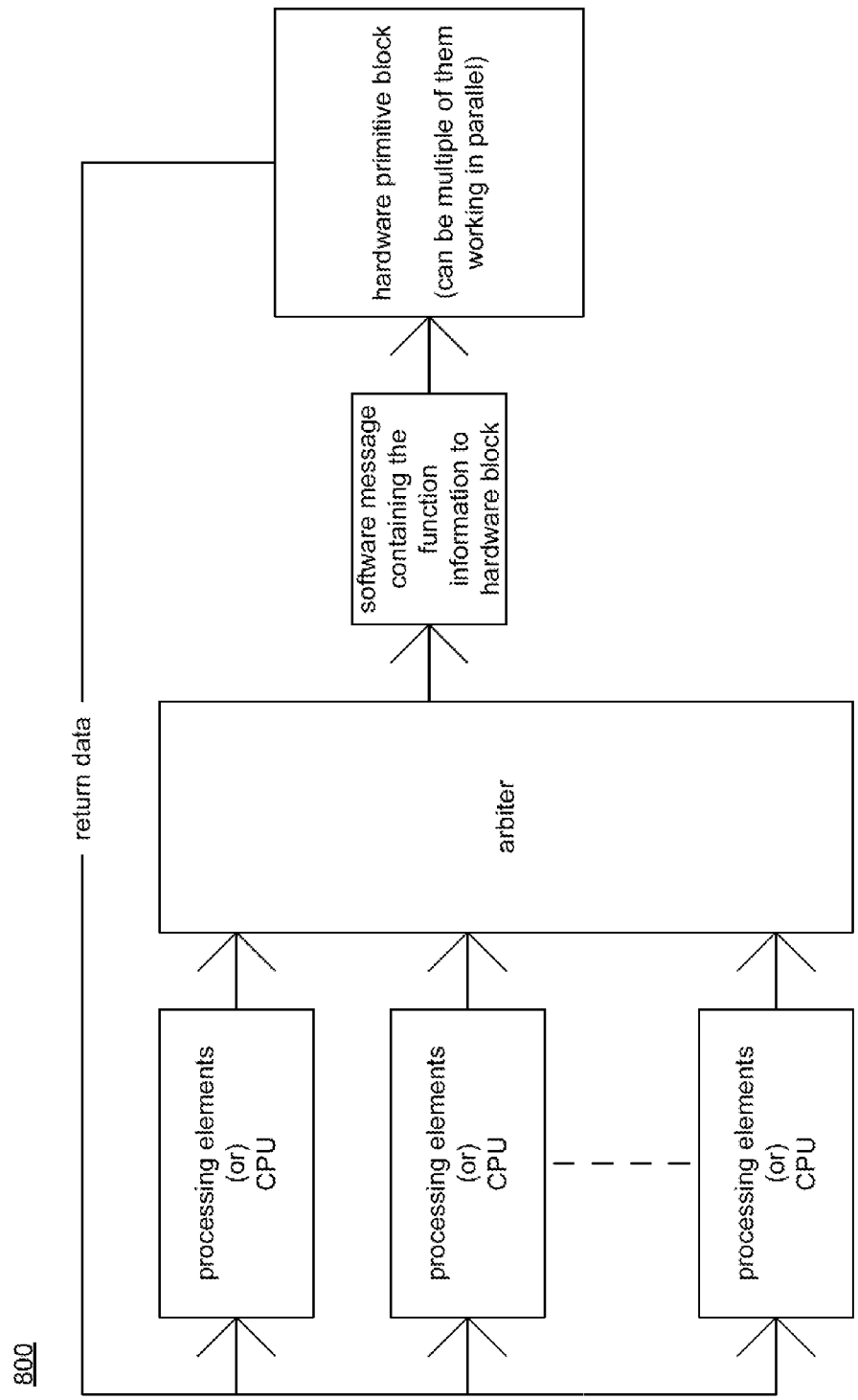
FIG. 8 is a block diagram of an example system for invoking system 700, according to an embodiment.

FIG. 8 is a block diagram of an example system for invoking system 700, according to an embodiment. In FIG. 8, a system 800 may include a software interface to invoke various configurations of system 700 in order to perform functions such as, but not limited to, convolution, matrix multiplication, cross correlation, calculations for determining a centroid for multiple blocks working in parallel for large block/frame level operations. System 800 may also include a software interface to invoke various configurations of system 700 in order to perform functions such as, but not limited to, and image scaling and operations on a single element, such as, for example, a convolution operation on a single pixel. The purpose of the software interface may be to prepare the threads to call the hardware primitives. The software interface may be configured to launch threads in parallel depending upon the workload. Further information about embodiments of the software interface is provided below in conjunction with the specific mathematical operations supported by the software interface.

Matrix Multiplication

Returning to FIG. 4, system 400 may be configured to perform a variety of mathematical operations. For example, let matrix H be:

$$\begin{bmatrix} h_{11} & h_{12} \\ h_{21} & h_{22} \end{bmatrix} = \begin{bmatrix} 1 & 2 \\ 3 & 4 \end{bmatrix}$$

Let matrix I be:

$$\begin{bmatrix} i_{11} & i_{12} \\ i_{21} & i_{22} \end{bmatrix} = \begin{bmatrix} 2 & -2 \\ 1 & -1 \end{bmatrix}$$

Let matrix J be equal to matrix H multiplied by matrix I.

$$J = H \times I$$

$$\begin{bmatrix} j_{11} & j_{12} \\ j_{21} & j_{22} \end{bmatrix} = \begin{bmatrix} h_{11}i_{11} + h_{12}i_{21} & h_{11}i_{12} + h_{12}i_{22} \\ h_{21}i_{11} + h_{22}i_{21} & h_{21}i_{12} + h_{22}i_{22} \end{bmatrix}$$

which equals:

$$\begin{bmatrix} (1)(2)+(2)(1) & (1)(-2)+(2)(-1) \\ (3)(2)+(4)(1) & (3)(-2)+(4)(-1) \end{bmatrix} = \begin{bmatrix} 4 & -4 \\ 10 & -10 \end{bmatrix}$$

With reference to FIGS. 1 and 4, system 400 may, for example, perform the mathematical operations to calculate matrix J by using subsystem $402_{11}$ to calculate $j_{11}$, subsystem $402_{12}$ to calculate $j_{12}$, subsystem $402_{21}$ to calculate $j_{21}$, and subsystem $402_{22}$ to calculate $j_{22}$. The calculations may be performed as follows: (1) accumulators $108_{11}$, $108_{12}$, $108_{21}$, and $108_{22}$ may receive reset signals $128_{11}$, $128_{12}$, $128_{21}$, and $128_{22}$ so that accumulative values $124_{11}$, $124_{12}$, $124_{21}$, and $124_{22}$ may be set equal to 0; (2) subsystem $402_{11}$ may calculate $h_{11}i_{11}+h_{12}i_{21}=(1)(2)+(2)(1)$ so that first sum value $122_{11}$ is equal to $j_{11}=4$, then, in a first cycle of clock signal 126, accumulator $108_{11}$ may add existing first sum value $122_{11}$, 4, to existing accumulative value $124_{11}$, 0, to produce a new accumulative value $124_{11}$, 4; (3) subsystem $402_{12}$ may calculate $h_{11}i_{12}+h_{12}i_{22}=(1)(-2)+(2)(-1)$ so that first sum value $122_{12}$ is equal to $j_{12}=-4$, then, in the first cycle of clock signal 126, accumulator $108_{12}$ may add existing first sum value $122_{12}$, -4, to existing accumulative value $124_{12}$, 0, to produce a new accumulative value $124_{12}$, -4; (4) subsystem $402_{21}$ may calculate $h_{21}i_{11}+h_{22}i_{21}=(3)(2)+(4)(1)$ so that first sum value $122_{21}$ is equal to $j_{21}=10$, then, in the first cycle of clock signal 126, accumulator $108_{21}$ may add existing first sum value $122_{21}$, 10, to existing accumulative value $124_{21}$, 0, to produce a new accumulative value $124_{21}$, 10; and (5) subsystem $402_{22}$ may calculate $h_{21}i_{12}+h_{22}i_{22}=(3)(-2)+(4)(-1)$ so that first sum value $122_{22}$ is equal to $j_{22}=-10$, then, in the first cycle of clock signal 126, accumulator $108_{22}$ may add existing first sum value $122_{22}$, -10, to existing accumulative value $124_{22}$, 0, to produce a new accumulative value $124_{22}$, -10.

Matrices H and I used in the example described above were merely to illustrate how system 400 may be used to multiply matrix H by matrix I. One of skill in the art recognizes that matrices having dimensions different from those of matrices H and I may also be multiplied using system 400. Moreover, one of skill in the art recognizes that two matrices may not have identical dimensions and yet may still be multiplied.

One of skill in the art recognizes that the following software interface may be used to support matrix multiplication:

Matrix_multiplication(ptr*input1,X1,Y1,size_x,
    size_w,size_y,ptr*input2,X2,Y2,out<size_x,
    size_y>)

where:

input1, input2 are the two input surfaces

X1, Y1: coordinate for the block to be read from input1 surface

X2, Y2: coordinate for the block to be read from input2 surface size_y, size_w: rows X columns of data to be read from input1 size_w, size_x: rows X columns of data to be read from input2 for the matrix multiplication Out<size_y,size_x>: output of the matrix multiplication One of skill in the art recognizes that this software interface may assume that the hardware is configured to do 'p wide'×'(q*h) high' multiplications and the conditions to be met for each matrix multiplication operation to be done in hardware is "size_w<=(q*h) AND size_x<=p". The above operation may be repeated size_y times to get that many rows of output of the matrix multiplication. The q*h and p may be designed in such a way that the design is optimum depending on the need of the matrix multiplication in the chip. Further, it may be configured in other ways, such as <p*q/2, h*q/2>, for example. Larger matrix multiplications may be done by calling the above hardware primitive multiple times and accumulating the results in the central processing unit or the graphics processing unit. Alternatively, the accumulator in the hardware primitive may be designed to accumulate the result across multiple calls to the hardware primitive, indicating the start and end of the calls. In this latter case, all calls may be sequenced back to back.

One of skill in the art recognizes that where h equals the number of multipliers 102, 104, etc. per adder 106; p equals the number of subsystems 402 along first dimension 408; and q equals the number of subsystems 402 along second dimension 410, that the input format is 16 bits (although the same can be done for 8-bit input also), and that input1[size_y][size_w] and input2[size_w][size_x] may, for example, be inputs for matrix multiplication using the following pseudo code:

```
//Initialize
For (vert_phase = 0; vert_phase < size_y; vert_phase++)
{   // hardware configuration
    for (i = 0; i < size_x; i++){    // size_x <= p
        A[vert_phase][i] = 0;
    }
}
For (vert_phase = 0; vert_phase < size_y; vert_phase++)
{   // hardware configuration
    for (i = 0; i < size_x; i++){
        for (j = 0; j < q; j++)    // size_w <= (q * h)
        {
            For (k = 0; k < h; k++)    // sample inputs
            {
                If (j * h + k < size_w){
                    input1_1×h[k] = input1[Y1+vert_phase][X1+k+j*h]
                    input2_1×h[k] = input2[Y2+k+j*h][X2+i]
                }
                Else {
                    input1_1×h[k] = 0
```

```
                    input2_1×h[k] = 0
                }
            }
            filter_1×h(input1_1×h, input2_1×h, Out_L_X, null)
            A[vert_phase][i] =+ Out_L_X    // MAC operation
for 16 bit input
        }
    }
}
```

Convolution

FIGS. 9A through 9C illustrate an example of a matrix convolved with another matrix. In FIGS. 9A through 9C, let matrix K be:

$$\begin{bmatrix} k_{11} & k_{12} & k_{13} \\ k_{21} & k_{22} & k_{23} \\ k_{31} & k_{32} & k_{33} \end{bmatrix} = \begin{bmatrix} 0 & -1 & 0 \\ -2 & 4 & 2 \\ 0 & 1 & 0 \end{bmatrix}$$

Let matrix L be:

$$\begin{bmatrix} l_{11} & l_{12} & l_{13} \\ l_{21} & l_{22} & l_{23} \\ l_{31} & l_{32} & l_{33} \end{bmatrix} = \begin{bmatrix} 1 & 2 & 3 \\ 4 & 5 & 6 \\ 7 & 8 & 9 \end{bmatrix}$$

Let matrix M be equal to matrix L convolved with matrix K. Using the center element of matrix K (here, $k_{22}$, 4) as the reference element, FIGS. 9A through 9C graphically illustrate how a convolution is calculated by: (1) rotating matrix K 180 degrees, (2) placing the reference element of matrix K so that it coincides with an element of matrix L (initially, $l_{11}$, 1), (3) multiplying the value of each element of matrix K with the value of its coincidental element of matrix L, (4) adding the products of each multiplication to calculate the value of the element of matrix M (initially, $m_{11}$) that corresponds to the element of matrix L that coincides with the reference element of matrix K, and (5) repeating the process for other elements of matrix L. In FIGS. 9A through 9C:

$$m_{11} = (0 \times 0) + (1 \times 0) + (0 \times 0) + (2 \times 0) + (4 \times 1) + \\ (-2 \times 2) + (0 \times 0) + (-1 \times 4) + (0 \times 5)$$
$$= -4$$

$$m_{12} = (0 \times 0) + (1 \times 0) + (0 \times 0) + (2 \times 1) + (4 \times 2) + \\ (-2 \times 3) + (0 \times 4) + (-1 \times 5) + (0 \times 6)$$
$$= -1$$

$$m_{13} = (0 \times 0) + (1 \times 0) + (0 \times 0) + (2 \times 2) + (4 \times 3) + \\ (-2 \times 0) + (0 \times 5) + (-1 \times 6) + (0 \times 0)$$
$$= 10$$

$$m_{21} = (0 \times 0) + (1 \times 1) + (0 \times 2) + (2 \times 0) + (4 \times 4) + \\ (-2 \times 5) + (0 \times 0) + (-1 \times 7) + (0 \times 8)$$
$$= 0$$

$$m_{22} = (0 \times 1) + (1 \times 2) + (0 \times 3) + (2 \times 4) + (4 \times 5) + \\ (-2 \times 6) + (0 \times 7) + (-1 \times 8) + (0 \times 9)$$
$$= 10$$

$$m_{23} = (0 \times 2) + (1 \times 3) + (0 \times 0) + (2 \times 5) + (4 \times 6) + \\ (-2 \times 0) + (0 \times 8) + (-1 \times 9) + (0 \times 0) \\ = 28$$

$$m_{31} = (0 \times 0) + (1 \times 4) + (0 \times 5) + (2 \times 0) + (4 \times 7) + \\ (-2 \times 8) + (0 \times 0) + (-1 \times 0) + (0 \times 0) \\ = 16$$

$$m_{32} = (0 \times 4) + (1 \times 5) + (0 \times 6) + (2 \times 7) + (4 \times 8) + \\ (-2 \times 9) + (0 \times 0) + (-1 \times 0) + (0 \times 0) \\ = 33$$

$$m_{33} = (0 \times 5) + (1 \times 6) + (0 \times 0) + (2 \times 8) + (4 \times 9) + \\ (-2 \times 0) + (0 \times 0) + (-1 \times 0) + (0 \times 0) \\ = 58$$

Figure 10C:
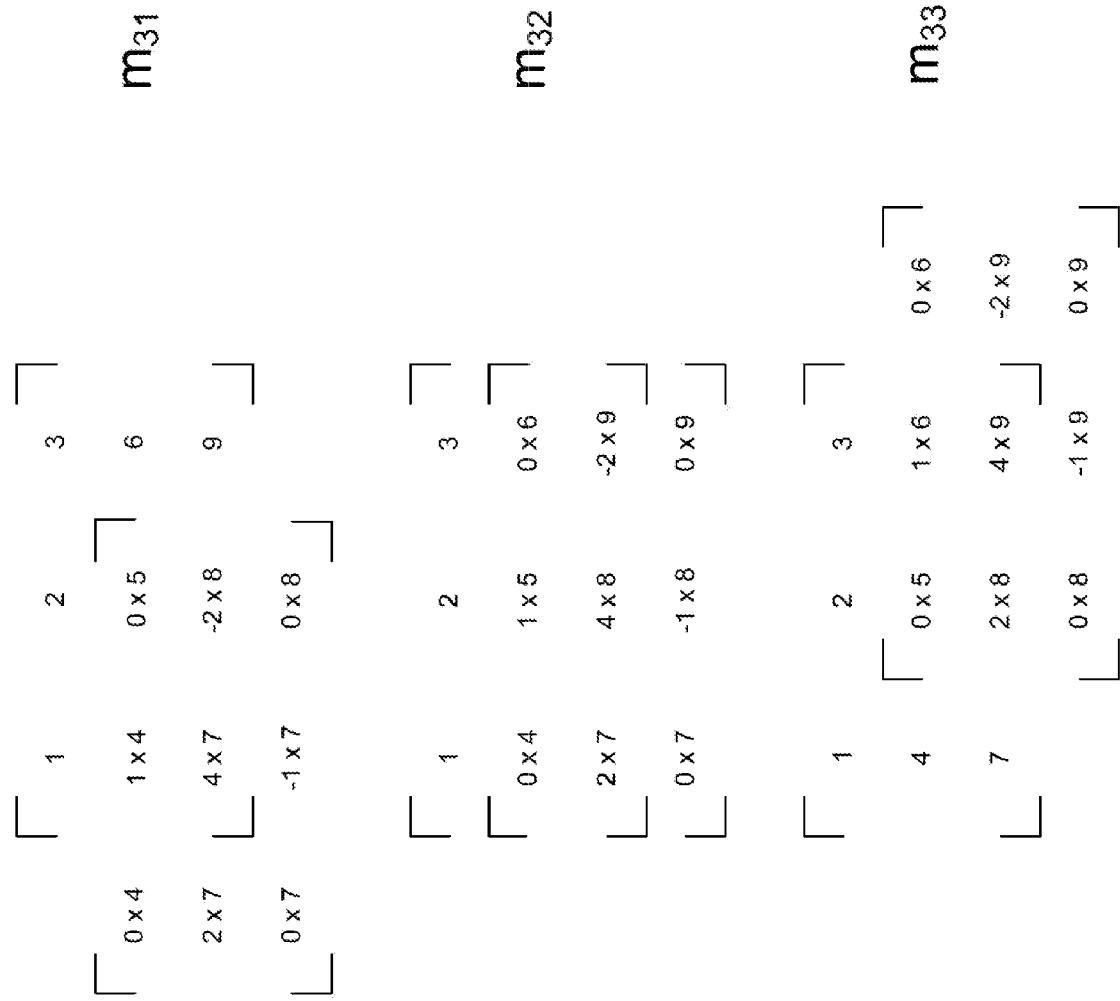

In the convolution graphically illustrated in FIGS. 9A through 9C, the values of the elements of matrix K that do not coincide with elements of matrix L are multiplied by zero. One of skill in the art recognizes that this may dilute the effect of the convolution for elements along the edges of matrix M. One way to limit this dilution may be to clamp values across the edges of matrix L to the values of the elements along the edges so that the elements of matrix K that do not coincide with elements of matrix L are multiplied by these clamped values. FIGS. 10A through 100C illustrate as example of a matrix convolved with another matrix using clamped values. In FIGS. 10A through 10C:

$$m_{11} = (0 \times 1) + (1 \times 1) + (0 \times 2) + (2 \times 1) + (4 \times 1) + \\ (-2 \times 2) + (0 \times 4) + (-1 \times 4) + (0 \times 5) \\ = -1$$

$$m_{12} = (0 \times 1) + (1 \times 2) + (0 \times 3) + (2 \times 1) + (4 \times 2) + \\ (-2 \times 3) + (0 \times 4) + (-1 \times 5) + (0 \times 6) \\ = 1$$

$$m_{13} = (0 \times 2) + (1 \times 3) + (0 \times 3) + (2 \times 2) + (4 \times 3) + \\ (-2 \times 3) + (0 \times 5) + (-1 \times 6) + (0 \times 6) \\ = 7$$

$$m_{21} = (0 \times 1) + (1 \times 1) + (0 \times 2) + (2 \times 4) + (4 \times 4) + \\ (-2 \times 5) + (0 \times 7) + (-1 \times 7) + (0 \times 8) \\ = 8$$

$$m_{22} = (0 \times 1) + (1 \times 2) + (0 \times 3) + (2 \times 4) + (4 \times 5) + \\ (-2 \times 6) + (0 \times 7) + (-1 \times 8) + (0 \times 9) \\ = 10$$

$$m_{23} = (0 \times 2) + (1 \times 3) + (0 \times 3) + (2 \times 5) + (4 \times 6) + \\ (-2 \times 6) + (0 \times 8) + (-1 \times 9) + (0 \times 9) \\ = 16$$

$$m_{31} = (0 \times 4) + (1 \times 4) + (0 \times 5) + (2 \times 7) + (4 \times 7) + \\ (-2 \times 8) + (0 \times 7) + (-1 \times 7) + (0 \times 8) \\ = 23$$

$$m_{32} = (0 \times 4) + (1 \times 5) + (0 \times 6) + (2 \times 7) + (4 \times 8) + \\ (-2 \times 9) + (0 \times 7) + (-1 \times 8) + (0 \times 9) \\ = 25$$

$$m_{33} = (0 \times 5) + (1 \times 6) + (0 \times 6) + (2 \times 8) + (4 \times 9) + \\ (-2 \times 9) + (0 \times 8) + (-1 \times 9) + (0 \times 9) \\ = 31$$

Figure 11C:
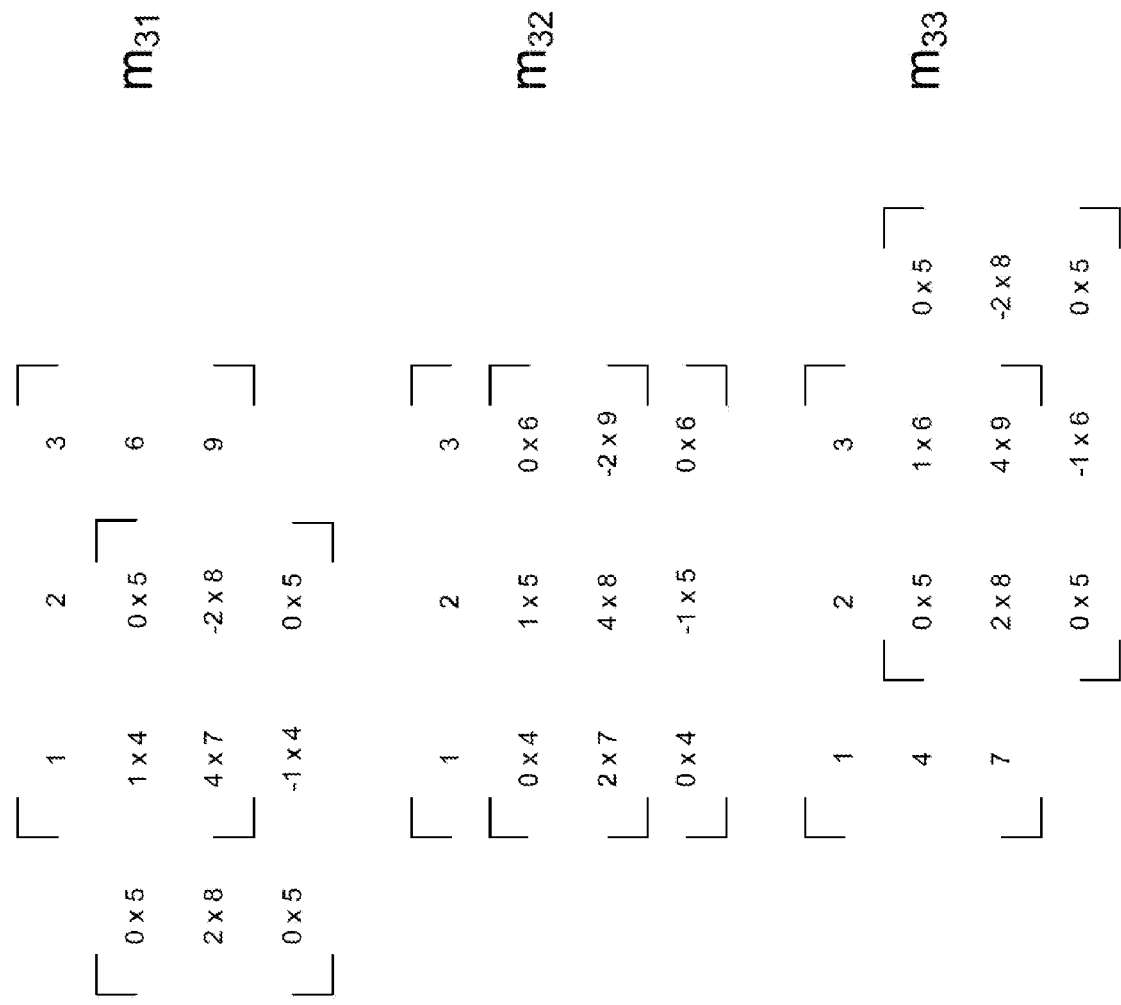

Another way to limit the dilution of the effect of the convolution for elements along the edges of matrix MN may be mirror values of elements internal from the edges of matrix L (excluding values of elements along the edges) across the edges so that the elements of matrix K that do not coincide with elements of matrix L are multiplied by these mirrored values. FIGS. 11A through 11C illustrate an example of a matrix convolved with another matrix using mirrored values. In FIGS. 11A through 11C:

$$m_{11} = (0 \times 5) + (1 \times 4) + (0 \times 5) + (2 \times 2) + (4 \times 1) + \\ (-2 \times 2) + (0 \times 5) + (-1 \times 4) + (0 \times 5) \\ = 4$$

$$m_{12} = (0 \times 4) + (1 \times 5) + (0 \times 6) + (2 \times 1) + (4 \times 2) + \\ (-2 \times 3) + (0 \times 4) + (-1 \times 5) + (0 \times 6) \\ = 4$$

$$m_{13} = (0 \times 5) + (1 \times 6) + (0 \times 5) + (2 \times 2) + (4 \times 3) + \\ (-2 \times 2) + (0 \times 5) + (-1 \times 6) + (0 \times 5) \\ = 12$$

$$m_{21} = (0 \times 2) + (1 \times 1) + (0 \times 2) + (2 \times 5) + (4 \times 4) + \\ (-2 \times 5) + (0 \times 8) + (-1 \times 7) + (0 \times 8) \\ = 10$$

$$m_{22} = (0 \times 1) + (1 \times 2) + (0 \times 3) + (2 \times 4) + (4 \times 5) + \\ (-2 \times 6) + (0 \times 7) + (-1 \times 8) + (0 \times 9) \\ = 10$$

$$m_{23} = (0 \times 2) + (1 \times 3) + (0 \times 2) + (2 \times 5) + (4 \times 6) + \\ (-2 \times 5) + (0 \times 8) + (-1 \times 9) + (0 \times 8) \\ = 18$$

$$m_{31} = (0 \times 5) + (1 \times 4) + (0 \times 5) + (2 \times 8) + (4 \times 7) + \\ (-2 \times 8) + (0 \times 5) + (-1 \times 4) + (0 \times 5) \\ = 28$$

$$m_{32} = (0 \times 4) + (1 \times 5) + (0 \times 6) + (2 \times 7) + (4 \times 8) + \\ (-2 \times 9) + (0 \times 4) + (-1 \times 5) + (0 \times 6) \\ = 28$$

$$m_{33} = (0 \times 5) + (1 \times 6) + (0 \times 5) + (2 \times 8) + (4 \times 9) + \\ (-2 \times 8) + (0 \times 5) + (-1 \times 6) + (0 \times 5) \\ = 36$$

With reference to FIGS. 1 and 4, system 400 may, for example, perform the mathematical operations to calculate matrix M by using subsystem 402$_{11}$ to calculate m$_{11}$, subsystem 402$_{12}$ to calculate m$_{12}$, subsystem 402$_{13}$ (not shown) to calculate m$_{13}$, subsystem 402$_{21}$ to calculate m$_{21}$, subsystem 402$_{22}$ to calculate m$_{22}$, subsystem 402$_{23}$ (not shown) to calculate m$_{23}$, subsystem 402$_{31}$ (not shown) to calculate m$_{31}$, subsystem 402$_{32}$ (not shown) to calculate m$_{32}$, and subsystem 402$_{33}$ (not shown) to calculate m$_{33}$. In this example, each adder 106 or 206 of each subsystem 402 may include a third multiplier (not shown) configured in the same manner as each of multipliers 102/202 and 104/204.

Initially, accumulators $108_{11}$, $108_{12}$, $108_{13}$ (not shown), $108_{21}$, $108_{22}$, $108_{23}$ (not shown), $108_{31}$ (not shown), $108_{32}$ (not shown), and $108_{33}$ (not shown) may receive reset signals $128_{11}$, $128_{12}$, $128_{13}$ (not shown), $128_{21}$, $128_{22}$, $128_{23}$ (not shown), $128_{31}$ (not shown), $128_{32}$ (not shown), and $128_{33}$ (not shown) so that accumulative values $124_{11}$, $124_{12}$, $124_{13}$ (not shown), $124_{21}$, $124_{22}$, $124_{23}$ (not shown), $124_{31}$ (not shown), $124_{32}$ (not shown), and $124_{33}$ (not shown) may be set equal to 0.

Next, in the case of performing the operations to calculate, for example, $m_{11}$ for matrix M in which matrix M is to be calculated using mirrored values: (1) subsystem $402_{11}$ may calculate $k_{33}l_{22}+k_{32}l_{21}+k_{31}l_{22}=(0)(5)+(1)(4)+(0)(5)$ so that sum value $122_{11}$ is equal to 4, (2) then, in a first cycle of clock signal 126, accumulator $108_{11}$ may add existing sum value $122_{11}$, 4, to existing accumulative value $124_{11}$, 0, to produce a new accumulative value $124_{11}$, 4, while subsystem $402_{11}$ may calculate $k_{23}l_{12}+k_{22}l_{11}+k_{21}l_{12}=(2)(2)+(4)(1)+(-2)(2)$ so that sum value $122_{11}$ is equal to 4, (3) then, in a second cycle of clock signal 126, accumulator $108_{11}$ may add existing sum value $122_{11}$, 4, to existing accumulative value $124_{11}$, 4, to produce a new accumulative value $124_{11}$, 8, while subsystem $402_{11}$ may calculate $k_{13}l_{22}+k_{12}l_{21}+k_{11}l_{22}=(0)(5)+(-1)(4)+(0)(5)$ so that sum value $122_{11}$ is equal to $-4$, and (4) finally, in a third cycle of clock signal 126, accumulator $108_{11}$ may add existing sum value $122_{11}$, $-4$, to existing accumulative value $124_{11}$, 8, to produce a new accumulative value $124_{11}$ equal to $m_{11}=4$.

One of skill in the art recognizes that subsystems $402_{12}$, $402_{13}$ (not shown), $402_{21}$, $402_{22}$, $402_{23}$ (not shown), $402_{31}$ (not shown), $402_{32}$ (not shown), and $402_{33}$ (not shown) may be used to calculate, respectively $m_{12}$, $m_{13}$, $m_{21}$, $m_{22}$, $m_{23}$, $m_{31}$, $m_{32}$, and $m_{33}$ in a manner similar to the one used by subsystem $402_{11}$ to calculate $m_{11}$.

One of skill in the art recognizes that if system 400 is configured as described in this example, then all nine of the elements of matrix M may be calculated concurrently in three cycles of clock signal 126. Alternatively, one of skill in the art recognizes that if system 400, as described in this example, was to be modified so that each adder 106 or 206 of each subsystem 400 included nine multipliers (not shown) with each configured in the same manner as each of multipliers 102/202 and 104/204, then all nine of the elements of matrix M may be calculated concurrently in one cycle of clock signal 126.

Matrices K and L used in the example described above were merely to illustrate how system 400 may be used to convolve matrix L with matrix K. One of skill in the art recognizes that matrices having dimensions different from those of matrices K and L may also be convolved using system 400. Moreover, one of skill in the art recognizes that two matrices may not have identical dimensions and yet may still be convolved.

One of skill in the art recognizes that the following software interface may be used to support calculating two dimensional, one dimensional, and single element convolutions:

Convolution(ptr*Input_surface,X,Y,Coefficients<kh, kw>,kernel_height,kernel_width,Block_size, out_shift,out< >)

where:
input_surface: is the pointer to the input surface to be convolved
X, Y: coordinates of the block in the input surface to be convolved
coefficient<kh,kw>: coefficients of the kernel function for convolution
  kh,kw: kernel_height×kernel width of the coefficients in the kernel
  (the coefficient suggested may be s3.16 (total of 16 bits),
    but design is not limited and it can support any particular format)
kernel_height: convolution kernel height
  (should be 1 when 1D horizontal convolution)
kernel_width: convolution kernel_width
  (should be 1 when 1D vertical convolution)
out_shift: the immediate output is right-shifted by this amount
  before being clamped and sent out in the out< >
out< >: output of the convolution function
  (the size of the output is dependent on the block_size)
  (the precision of the output can be varied, depending on the requirement, from byte, word (short), or dword (int))
block_size: determines the hardware primitive block_size for the convolution operation
  can be p×q or p×1 or 1×1
  when block size is p×q:
  p×q is determined as per the hardware implementation
    where p is the number of pixels that can be convolved in one time with 1×q convolutions per clock
  the number of clocks will depend on the kernel_width to complete a kernel_width×h convolution
  the above is repeated CEILING(kernel_height/h) times
    to complete one convolve operation of 'kernel_width×kernel_height'
    for 'p×q' pixels
  when block size is p×1:
  each clock a convolution of 1×(q*h) convolutions is done
  the number of clocks to complete the kernel_width× (q*h) convolution depends on kernel_width
  the above is repeated CEILING(kernel_height/(q*h)) times
    to complete one convolve operation of 'kernel_width×kernel_height'
    for 'p×1' pixels
    (if required, the hardware can be reconfigured
      to do a greater number of pixels (like (p*h)×1 pixels) and only do 1×h convolutions per clock,
      or any other combination)
  when block size is 1×1:
  a p×(q*h) convolution is performed in a single clock
  this is repeated for CEILING(kernel_width/p)*CEILING(kernel_height/q*h)
    to complete the convolution of 'kernel_width×kernel_height' for 1 pixel
    (depending on the design requirement,
      the 'q' blocks can be arranged differently)
        (for example, a '(p*q)×h' convolution
          can be done in each clock)

One of skill in the art understands that if it is assumed, as in the example presented above, that the convolve kernel/coefficient may be taken as having s3.12 format (16 bits), but not limited to this format only, to optimize the design for die size, that the following floating to fixed point calculation may give the optimal precision for the convolve operation. Assuming all coefficients will be less than 8. In the case that a coefficient is greater than 8, then the coefficient would need to be scaled down such that the maximum value is less than 8 before doing the following calculation. The scale up of the resultant convolve value may then need to be done in the appropriate processing element of the central processing unit or the graphics processing unit. In the case that a coefficient is less than $1/2^7$, then the coefficient can be scaled up by a driver and later the result from the convolve operation can be scaled down by processing elements of the central processing unit or the graphics processing unit.

```
If(MAX(ABS(C[j][i])) <= 8.0) && (MAX(ABS(C[j][i])) >= 1.0/2^7){
    out_shift = max_power_of_2(8/MAX(ABS(C[j][i]))) //
        across all coefficients
}
```

```
fixed_point_coefficient[j][i] = Floor(2^out_shift) * C[j][i]*2^12)
    // repeated for al coefficients to get s3.12
``` where:
C[j][i] are the 2D coefficients for convolution in floating point fixed_point_coefficient[j][i] are the 2D coefficients for convolution
that is in fixed s3.12 format and these are the actual input sent to the hardware primitive The following pseudo code may be used for a two dimensional convolution in a manner similar to the example described above:

```
p = no. of pixels in x-direction for 16-bit input; 2*p = no. of pixels in x-direction for 8-bit
input
q = no. pixels in y-direction
IN = input image matrix -IN[y][x]
C = coefficient matrix - C[y][x]
mirror_clamp(in_i, in_j, width, height, out_i, out_j, mirror_mode)
        (address control function to either clamp or mirror the address
            in case it crosses the boundary of the input image)
//initialization
For (vert_phase = 0; vert_phase < CEIL(kernel_height/h) ; vert_phase++){
    For (hortz_phase = 0; hortz_phase < kernel_width ; hortz_phase++)
    //vert_phase and hortz_phase can represent clock sequencing in hardware.
    {   // hardware configuration
        for (j = 0; j < q; j++){
            for (i = 0; i < p; i++)
            {
                A_h[j][i] = 0
                A_l[j][i] = 0
            }
        }
    }
}
For (vert_phase = 0; vert_phase < CEIL(kernel_height/h) ; vert_phase++){
    For (hortz_phase = 0; hortz_phase < kernel_width ; hortz_phase++)
    //vert_phase and hortz_phase can represent clock sequencing in hardware
    {   // hardware configuration
        for (j = 0; j < q; j++){
            for (i = 0; i < p; i++)
            {
                For (k = 0; k < h; k++)    // sample inputs
                {
                    If(ind 16){
                        jj = Y + (j+vert_phase*h+k) - FLOOR((kernel_height-1)/2)
                        ii = X + (i+hortz_phase) - FLOOR((kernel_width-1)/2)
                        mirror_clamp(ii, jj, img_width, img_height, ii_mirror, jj_mirror, mirror_mode)
                        IN_1xh[k] = IN[jj_mirror][ii_mirror]
                    }
                    Else {
                        jj = Y + (j+vert_phase*h+k) - FLOOR((kernel height-1)/2)
                        ii_evenpix = X + 2*(i+hortz_phase) - FLOOR((kernel_width-1)/2)
                        ii_oddpix = X + 2*(i+hortz_phase) + 1 - FLOOR((kernel_width-1)/2)
                        mirror_clamp(ii_evenpix,  jj,  img_width,  img_height, ii_evenpix_mirror,
                        jj_evenpix_mirror, mirror_mode)
                        mirror_clamp(ii_oddpix,  jj,  img_width,  img_height, ii_oddpix_mirror,
                        jj_oddpix_mirror, mirror_mode)
                        IN_1xh[k][15:8] = IN[jj_evenpix_mirror][ii_oddpix_mirror]
                        IN_1xh[k][7:0] = IN[jj_oddpix_mirror][ii_evenpix_mirror]
                    }
                    C_1xh[k] = C[vert_phase*h][hortz_phase]
                }
```

```
                filter_1xh(IN_1xh, C_1xh, Out_L_X, Out_H_X)
                    A_h[j][i] =+ Out_L_X //Accumulate operation for upper 8 bit input. Ignored for 16 bit
input.
                    A_l[j][i] =+ Out_H_X //Accumulate operation for 16 bit input (or) lower 8 bit input
                }
            }
        }
    }
```

One of skill in the art recognizes that convolution operations may be used extensively in processing digital images and that often a convolution operation may be performed on values of one dimension of a digital image. For example, let matrix N be equal to the first column of matrix L convolved with matrix K using clamped values:

$$n_{11} = (0 \times 1) + (1 \times 1) + (0 \times 1) + (2 \times 1) +$$
$$(4 \times 1) \times (-2 \times 1) + (0 \times 4) + (-1 \times 4) + (0 \times 4)$$
$$= 1$$

$$n_{21} = (0 \times 1) + (1 \times 1) + (0 \times 1) + (2 \times 4) +$$
$$(4 \times 4) \times (-2 \times 4) + (0 \times 7) + (-1 \times 7) + (0 \times 7)$$
$$= 10$$

$$n_{31} = (0 \times 4) + (1 \times 4) + (0 \times 4) + (2 \times 7) +$$
$$= (4 \times 7) \times (-2 \times 7) + (0 \times 7) + (-1 \times 7) + (0 \times 7)$$
$$= 25$$

With reference to FIGS. 1 and 4, system 400 may, for example, perform the mathematical operations to calculate matrix N by using subsystem $402_{11}$, subsystem $402_{21}$, and subsystem $402_{31}$ (not shown) to calculate $n_{11}$; subsystem $402_{12}$, subsystem $402_{22}$, and subsystem $402_{32}$ (not shown) to calculate $n_{21}$; and subsystem $402_{13}$ (not shown), subsystem $402_{23}$ (not shown), and subsystem $402_{33}$ (not shown) to calculate $n_{31}$. In this example, each adder 106 or 206 of each subsystem 402 may include a third multiplier (not shown) configured in the same manner as each of multipliers 102/202 and 104/204.

Initially, accumulators $416_1$, $416_2$, and $416_3$ (not shown) may receive reset signals $424_1$, $424_2$, and $424_3$ (not shown) so that accumulative values $420_1$, $420_2$, and $420_3$ (not shown) may be set equal to 0.

Next, in the case of performing the operations to calculate, for example, $n_{11}$ for matrix N in which matrix N is to be calculated using clamped values: (1) subsystem $402_{11}$ may calculate $k_{33}l_{11}+k_{32}l_{11}+k_{31}l_{11}=(0)(1)+(1)(1)+(0)(1)$ so that sum value $122_{11}$ is equal to 1, (2) subsystem $402_{21}$ may calculate $k_{23}l_{11}+k_{22}l_{11}+k_{21}l_{11}=(2)(1)+(4)(1)+(-2)(1)$ so that sum value $122_{21}$ is equal to 4, (3) subsystem $402_{31}$ (not shown) may calculate $k_{13}l_{21}+k_{12}l_{21}+k_{11}l_{21}=(0)(4)+(-1)(4)+(0)(4)$ so that sum value $122_{31}$ (not shown) is equal to $-4$, (4) adder $404_1$ may receive sum values $122_{11}$, 1, $122_{21}$, 4, and $122_{31}$, $-4$, and may produce sum value $412_1$, 1, and (6) then, in a first cycle of clock signal 126, accumulator $416_1$ may add existing sum value $412_1$, 1, to existing accumulative value $420_1$, 0, to produce a new accumulative value $420_1$ equal to $n_{11}=1$.

One of skill in the art recognizes that subsystem $402_{12}$, subsystem $402_{22}$, and subsystem $402_{32}$ (not shown) may be used to calculate $n_{21}$ and that subsystem $402_{13}$ (not shown), subsystem $402_{23}$ (not shown), and subsystem $402_{33}$ (not shown) may be used to calculate $n_{31}$ in a manner similar to the one used by subsystem $402_{11}$, subsystem $402_{21}$, and subsystem $402_{31}$ (not shown) to calculate $n_{11}$.

One of skill in the art recognizes that if system 400 is configured as described in this example, then all three of the elements of matrix N may be calculated in one cycle of clock signal 126.

One of skill in the art recognizes that system 400 may also, for example perform the mathematical operations to calculate matrix N equal to the first column of matrix L convolved with matrix K using mirrored values.

The following pseudo code may be used for a one dimensional convolution in a manner similar to the example described above:

```
//initialization
        For (vert_phase = 0; vert_phase < CEIL(kernel_height/(q*h)) ; vert_phase++){
            For (hortz_phase = 0; hortz_phase < kernel_width ; hortz_phase++)
            { //hardware configuration
                For (j = 0; j < q; j++) {
                    For (i = 0 ; i < p; i++) {
                        A_h[i] = 0
                        A_l[i] = 0
                    }
                }
            }
        }
        For (vert_phase = 0; vert_phase < CEIL(kernel_height/(q*h)) ; vert_phase++)
            For (hortz_phase = 0; hortz_phase < kernel_width ; hortz_phase++)
            { //hardware configuration
                For (j = 0; j < q; j++){
                    For (i = 0 ; i < p; i++){
                        For (k = 0; k < h; k++)    // sample inputs
                        {
                            If(ind 16){
                                jj = Y + ((j+vert_phase*q)*h+k) - FLOOR((kernel_height-
```

-continued

```
                ii = X + (i+hortz_phase) - FLOOR((kernel_width-1)/2)
                mirror_clamp(ii, jj, img_width, img_height, ii_mirror, jj_mirror,
mirror_mode)
                IN_1×h[k] = IN[jj_mirror][ii_mirror]
            Else {
                jj = Y + ((j+vert_phase*q)*h+k) - FLOOR((kernel_height-
1)/2)
                ii_oddpix = X + (2*(i+hortz_phase) + 1) - FLOOR((kernel_width-
1)/2)
                ii_evenpix = X + (2*(i+hortz_phase)) - FLOOR((kernel_width-
1)/2)
                mirror_clamp(ii_evenpix,  jj,   img_width,   img_height,
ii_evenpix_mirror,
                       jj_evenpix_mirror, mirror_mode)
                mirror_clamp(ii_oddpix,   jj,   img_width;   img_height,
ii_oddpix_mirror,
                       jj_oddpix_mirror, mirror_mode)
                IN_1×h[k][15:8] = IN[jj_oddpix_mirror][ii_oddpix_mirror]
                IN_1×h[k][7:0] = IN[jj_evenpix_mirror][ii_evenpix_mirror]
            }
            C_1×h[k] = C[k + (j + vert_phase*q)*h][hortz_phase]
            }
            filter_1×h(IN_1×h, C_1×h, Out_L_X, Out_H_X)
            A_h[j][i] =+ Out_L_X //Accumulate operation for upper 8 bit input. Ignored for 16 bit
input.
            A_l[j][i] =+ Out_H_X //Accumulate operation for 16 bit input (or) lower 8 bit input
        }
      }
    }
  }
  in above filter, if kernel_width = 1, 1D vertical convolution
  in above filter, if kernel_height = 1, need to transpose input and feed to above
module,
    which would behave similar to 1D vertical convolution
  here, the accumulator works only over the kernel_width or kernel height,
    depending, respectively, on 1D horizontal or vertical convolution
```

One of skill in the art also recognizes that sometimes a convolution operation may be performed on a value of a single element of a digital image. For example, let matrix O be equal to the top, left element of matrix L convolved with matrix K using clamped values:

$$o_{11} = (0 \times 1) + (1 \times 1) + (0 \times 1) + (2 \times 1) +$$
$$(4 \times 1) \times (-2 \times 1) + (0 \times 1) + (-1 \times 1) + (0 \times 1)$$
$$= 4$$

With reference to FIGS. 1 and 4, system 400 may, for example, perform the mathematical operations to calculate matrix O by using subsystem $402_{11}$, subsystem $402_{12}$, subsystem $402_{13}$ (not shown), subsystem $402_{21}$, subsystem $402_{22}$, subsystem $402_{23}$ (not shown), subsystem $402_{31}$ (not shown), subsystem $402_{32}$ (not shown), and subsystem $402_{33}$ (not shown).

System 400 may perform the operations to calculate, for example, matrix O: (1) accumulator 432 may receive reset signal 436 so that accumulative value 434 may be set equal to 0, (2) subsystem $402_{11}$ may calculate $k_{33}l_{11}=(0)(1)$ so that sum value $122_{11}$ is equal to 0, (3) subsystem $402_{12}$ may calculate $k_{32}l_{11}=(1)(1)$ so that sum value $122_{12}$ is equal to 1, (4) subsystem $402_{13}$ (not shown) may calculate $k_{31}l_{11}=(0)(1)$ so that sum value $122_{13}$ (not shown) is equal to 0, (5) subsystem $402_{21}$ may calculate $k_{23}l_{11}=(2)(1)$ so that sum value $122_{21}$ is equal to 2, (6) subsystem $402_{22}$ may calculate $k_{22}l_{11}=(4)(1)$ so that sum value $122_{22}$ is equal to 4, (7) subsystem $402_{23}$ (not shown) may calculate $k_{21}l_{11}=(-2)(1)$ so that sum value $122_{23}$ (not shown) is equal to −2, (8) subsystem $402_{31}$ (not shown) may calculate $k_{13}l_{11}=(0)(1)$ so that sum value $122_{31}$ (not shown) is equal to 0, (9) subsystem $402_{32}$ (not shown) may calculate $k_{12}l_{11}=(-1)(1)$ so that sum value $122_{32}$ (not shown) is equal to −1, (10) subsystem $402_{33}$ (not shown) may calculate $k_{11}l_{11}=(0)(1)$ so that sum value $122_{33}$ (not shown) is equal to 0, (11) adder $404_1$ may receive sum values $122_{11}$, 0, $122_{21}$, 2, and $122_{31}$, 0, and may produce sum value $412_1$, 2, (12) adder $404_2$ may receive sum values $122_{12}$, 1, $122_{22}$, 4, and $122_{32}$, −1, and may produce sum value $412_2$, 4, (13) adder $404_3$ (not shown) may receive sum values $122_{13}$, 0, $122_{23}$, −2, and $122_{33}$, 0, and may produce sum value $412_3$, −2, (14) adder 428 may receive sum values $412_1$, 2, $412_2$, 4, and $412_3$, −2, and may produce sum value 430, 4, and (15) then, in a first cycle of clock signal 126, accumulator 432 may add existing sum value 430, 4, to existing accumulative value 432, 0, to produce a new accumulative value 432 equal to $o_{11}=4$.

One of skill in the art recognizes that system 400 may also, for example perform the mathematical operations to calculate matrix O equal to the top, left element of matrix L convolved with matrix K using mirrored values.

The following pseudo code may be used for a single element convolution in a manner similar to the example described above:

```
//Initialize
    B_h = 0
    B_l = 0
    For (vert_phase = 0; vert_phase < CEIL (kernel_height/(q*h)) ; vert_phase++)
        For (hortz_phase = 0; hortz_phase < CEIL(kernel_width/p) ; hortz_phase++)
        { //hardware configuration
            For (j = 0; j < q; j++){
                For (i = 0 ; i < p; i++){
                    For (k = 0; k < h; k++)    //sample inputs
                    {
                        jj = Y + ((j+vert_phase*q)*h+k) - FLOOR((kernel_height-1)/2)
                        ii = X + (i+hortz_phase*p) - FLOOR((kernel_width-1)/2)
                        mirror_clamp(ii,  jj,  img_width,  img_height,  ii_mirror,  jj_minor, minor_mode)
                        IN_1xh[k] = IN[jj_mirro][ii_mirror]
                        C_1xh[k] = C[k + (j + vert_phase*q)*h][k + hortz_phase*p]
                    }
                    filter_1xh(IN_1xh, C_1xh, Out_L_X, Out_H_X)
                    B =+ Out_LX    // Accumulate operation
                }
            }
        }
```

Cross Correlation

FIGS. 12A through 12C illustrate an example of a matrix cross correlated with another matrix using clamped values. Let matrix P be equal to matrix L cross correlated with matrix K. Using the center element of matrix K (here, $k_{22}$, 4) as the reference element, FIGS. 12A through 12C graphically illustrate how a cross correlation is calculated by: (1) placing the reference element of matrix K so that it coincides with an element of matrix L (initially, $l_{11}$, 1), (2) multiplying the value of each element of matrix K with the value of its coincidental element of matrix L, (3) adding the products of each multiplication to calculate the value of the element of matrix P (initially, $p_{11}$) that corresponds to the element of matrix L that coincides with the reference element of matrix K, and (4) repeating the process for other elements of matrix L. In FIGS. 12A through 12C:

$$p_{11} = (0 \times 1) + (-1 \times 1) + (0 \times 2) + (-2 \times 1) + (4 \times 1) +$$
$$(2 \times 2) + (0 \times 4) + (1 \times 4) + (0 \times 5)$$
$$= 9$$

$$p_{12} = (0 \times 1) + (-1 \times 2) + (0 \times 3) + (-2 \times 1) + (4 \times 2) +$$
$$(2 \times 3) + (0 \times 4) + (1 \times 5) + (0 \times 6)$$
$$= 15$$

$$p_{13} = (0 \times 2) + (-1 \times 3) + (0 \times 3) + (-2 \times 2) + (4 \times 3) +$$
$$(2 \times 3) + (0 \times 5) + (1 \times 6) + (0 \times 6)$$
$$= 17$$

$$p_{21} = (0 \times 1) + (-1 \times 1) + (0 \times 2) + (-2 \times 4) + (4 \times 4) +$$
$$(2 \times 5) + (0 \times 7) + (1 \times 7) + (0 \times 8)$$
$$= 24$$

$$p_{22} = (0 \times 1) + (-1 \times 2) + (0 \times 3) + (-2 \times 4) + (4 \times 5) +$$
$$(2 \times 6) + (0 \times 7) + (1 \times 8) + (0 \times 9)$$
$$= 30$$

$$p_{23} = (0 \times 2) + (-1 \times 3) + (0 \times 3) + (-2 \times 5) + (4 \times 6) +$$
$$(2 \times 6) + (0 \times 8) + (1 \times 9) + (0 \times 9)$$
$$= 32$$

$$p_{31} = (0 \times 4) + (-1 \times 4) + (0 \times 5) + (-2 \times 7) + (4 \times 7) +$$
$$(2 \times 8) + (0 \times 7) + (1 \times 7) + (0 \times 8)$$
$$= 33$$

-continued $$p_{32} = (0 \times 4) + (-1 \times 5) + (0 \times 6) + (-2 \times 7) + (4 \times 8) +$$
$$(2 \times 9) + (0 \times 7) + (1 \times 8) + (0 \times 9)$$
$$= 39$$

$$p_{33} = (0 \times 5) + (-1 \times 6) + (0 \times 6) + (-2 \times 8) + (4 \times 9) +$$
$$(2 \times 9) + (0 \times 8) + (1 \times 9) + (0 \times 9)$$
$$= 41$$

With reference to FIGS. 1 and 4, system 400 may, for example, perform the mathematical operations to calculate matrix P by using subsystem $402_{11}$ to calculate $p_{11}$, subsystem $402_{12}$ to calculate $p_{12}$, subsystem $402_{13}$ (not shown) to calculate $p_{13}$, subsystem $402_{21}$ to calculate $p_{21}$, subsystem $402_{22}$ to calculate $p_{22}$, subsystem $402_{23}$ (not shown) to calculate $p_{23}$, subsystem $402_{31}$ (not shown) to calculate $p_{31}$, subsystem $402_{32}$ (not shown) to calculate $p_{32}$, and subsystem $402_{33}$ (not shown) to calculate $p_{33}$. In this example, each adder 106 or 206 of each subsystem 402 may include a third multiplier (not shown) configured in the same manner as each of multipliers 102/202 and 104/204.

Initially, accumulators $108_{11}$, $108_{12}$, $108_{13}$ (not shown), $108_{21}$, $108_{22}$, $108_{23}$ (not shown), $108_{31}$ (not shown), $108_{32}$ (not shown), and $108_{33}$ (not shown) may receive reset signals $128_{11}$, $128_{12}$, $128_{13}$ (not shown), $128_{21}$, $128_{22}$, $128_{23}$ (not shown), $128_{31}$ (not shown), $128_{32}$ (not shown), and $128_{33}$ (not shown) so that accumulative values $124_{11}$, $124_{12}$, $124_{13}$ (not shown), $124_{21}$, $124_{22}$, $124_{23}$ (not shown), $124_{31}$ (not shown), $124_{32}$ (not shown), and $124_{33}$ (not shown) may be set equal to 0.

Next, in the case of performing the operations to calculate, for example, $p_{11}$ for matrix P in which matrix P is to be calculated using clamped values: (1) subsystem $402_{11}$ may calculate $k_{11}l_{11}+k_{12}l_{11}+k_{13}l_{12}=(0)(1)+(-1)(1)+(0)(2)$ so that sum value $122_{11}$ is equal to −1, (2) then, in a first cycle of clock signal 126, accumulator $108_{11}$ may add existing sum value $122_{11}$, −1, to existing accumulative value $124_{11}$, 0, to produce a new accumulative value $124_{11}$, −1, while subsystem $402_{11}$ may calculate $k_{21}l_{11}+k_{22}l_{11}+k_{23}l_{12}=(-2)(1)+(4)(1)+$ (2)(2) so that sum value $122_{11}$ is equal to 6, (3) then, in a second cycle of clock signal 126, accumulator $108_{11}$ may add existing sum value $122_{11}$, 6, to existing accumulative value $124_{11}$, −1, to produce a new accumulative value $124_{11}$, 5, while subsystem $402_{11}$ may calculate $k_{31}l_{21}+k_{32}l_{21}+k_{33}l_{22}=(0)(4)+(1)(4)+(0)(5)$ so that sum value $122_{11}$ is equal to 4, and (4) finally, in a third cycle of clock signal 126, accumulator $108_{11}$ may add existing sum value $122_{11}$, 4, to existing accumulative value $124_{11}$, 5, to produce a new accumulative value $124_{11}$ equal to $p_{11}=9$.

One of skill in the art recognizes that subsystems $402_{12}$, $402_{13}$ (not shown), $402_{21}$, $402_{22}$, $402_{23}$ (not shown), $402_{31}$ (not shown), $402_{32}$ (not shown), and $402_{33}$ (not shown) may be used to calculate, respectively $p_{12}$, $p_{13}$, $p_{21}$, $p_{22}$, $p_{23}$, $p_{31}$, $p_{32}$, and $p_{33}$ in a manner similar to the one used by subsystem $402_{11}$ to calculate $p_{11}$.

One of skill in the art recognizes that if system 400 is configured as described in this example, then all nine of the elements of matrix P may be calculated concurrently in three cycles of clock signal 126. Alternatively, one of skill in the art recognizes that if system 400, as described in this example, was to be modified so that each adder 106 or 206 of each subsystem 400 included nine multipliers (not shown) with each configured in the same manner as each of multipliers 102/202 and 104/204, then all nine of the elements of matrix P may be calculated concurrently in one cycle of clock signal 126.

Matrices K and L used in the example described above were merely to illustrate how system 400 may be used to cross correlate matrix L with matrix K. One of skill in the art recognizes that matrices having dimensions different from those of matrices K and L may also be cross correlated using system 400. Moreover, one of skill in the art recognizes that two matrices may not have identical dimensions and yet may still be cross correlated.

One of skill in the art recognizes that system 400 may also, for example, perform the mathematical operations to calculate matrix P equal to matrix L cross correlated with matrix K using mirrored values.

One of skill in the art recognizes that the following software interface may be used to support calculating a cross correlation:

Cross Correlations(*ptr*input1,X1,Y1,*ptr*input2,X2, Y2,size_in_x,size_in_y,region_x,region_y,out)

where:
input1, input2 are the two input surfaces for cross correlation
X1, Y1: coordinate for the block to be read of size "size_in_y×size_in_x" from input1 surface
X2, Y2: coordinate for the block to be read from input2 surface
size_in_y, size_in_x: size of the cross correlation
region_y, region_x: block region size for correlation
out: output of the cross correlation
size_in_x<=p and size_in_y,+q*h
  (note: multiple cross correlations can be done dependent on the size in one call, dependent on the hardware primitive, and requirements of the chip)
  (for example, two pixels can be cross correlated in each clock
    if the following conditions are met:
      size_in_x<=p/2 and size_in_y<=q*h (or)
      size_in_z<=p and size_in_y,+q*h/2

One of skill in the art recognizes that with this software interface input1 and input2 may be multiplied and summed depending on the need of the application. The design may be split to give 'q' cross correlation results for a pxh region. The size may be varied and the number of cross correlations may also be varied depending on the need and what the hardware needs to perform.

One of skill in the art recognizes that where h equals the number of multipliers 102, 104, etc. per adder 106; p equals the number of subsystems 402 along first dimension 408; and q equals the number of subsystems 402 along second dimension 410, that the input format is 16 bits (although the same can be done for 8-bit input also), and that input1 [size_in_y][size_in_x] and input2[size_in_y+region_in_y] [size_in_x+region_in_x] may, for example, be inputs for the performance of a cross correlation using the following pseudo code:

```
//Assuming Size_in_x <= p and Size_in_y <= q*h
For(j = 0; j < region_in_y; j++){
    { // hardware configuration
    For(i = 0; i < region_in_x; i++){
        For(r = 0; r < (size_in_y/h); r++){
            For(s = 0; s < size_in_x; s++){
                For (k = 0; k < h; k++)    // sample inputs
                {
                    jj = Y1 + (r*h+k) - Floor((size_in_y-1)/2)
                    ii = X1 + s - Floor((size_in_x-1)/2)
                    mirror_clamp(ii, jj, src_width, src_height,
                    i_o, j_o, mirror_mode)
                    if((r*h+k) > size_in_y)
                        input_1×h[k] = 0
                    else
                        input_1×h[k] = inputl[j_o][i_o]
                    jj = Y2 + (j+r*h+k) - Floor((size_in_y-1)/2)
                    ii = X2 + (i+s) - Floor((size_in_x-1)/2)
                    mirror_clamp(ii, jj, src_width, src_height,
                    i_o, j_o, mirror_mode)
                    input2_1×h[k] = input2[j_o][i_o]
                }
                filter_1×h(input1_1×h, input2_1×h, Out_L_X, null)
                A[j][i] +=Out_L_X
            }
        }
    }
}
```

Centroid

To recall, for example, let matrix H be:

$$\begin{bmatrix} h_{11} & h_{12} \\ h_{21} & h_{22} \end{bmatrix} = \begin{bmatrix} 1 & 2 \\ 3 & 4 \end{bmatrix}$$

Let $(X_m, y_n)$ be equal to the centroid of matrix H.

$$\bar{x}_m = M(1, 0)/M(0, 0) \quad \text{Eq. (1)}$$

$$\bar{y}_n = M(0, 1)/M(0, 0) \quad \text{Eq. (2)}$$

$$M(0, 0) = \sum_m \sum_n H(m, n) \quad \text{Eq. (3)}$$
$$= h_{11} + h_{12} + h_{21} + h_{22}$$
$$= 1 + 2 + 3 + 4$$
$$= 10$$

$$M(1, 0) = \sum_m \sum_n H(m, n) \quad \text{Eq. (4)}$$
$$= (x_1)(h_{11}) + (x_1)(h_{12}) + (x_2)(h_{21}) + (x_2)(h_{22})$$
$$= (1)(1) + (1)(2) + (2)(3) + (2)(4)$$
$$= 17$$

-continued $$M(0, 1) = \sum_m \sum_n H(m, n) \qquad \text{Eq. (5)}$$
$$= (y_1)(h_{11}) + (y_2)(h_{12}) + (y_1)(h_{21}) + (y_2)(h_{22})$$
$$= (1)(1) + (2)(2) + (1)(3) + (2)(4)$$
$$= 16$$

$$\bar{x}_m = M(1, 0)/M(0, 0) \qquad \text{Eq. (6)}$$
$$= 17/10$$
$$= 1.7$$

$$\bar{y}_m = M(0, 1)/M(0, 0) \qquad \text{Eq. (7)}$$
$$= 16/10$$
$$= 1.6$$

With reference to FIGS. 1 and 4, system 400 may, for example, perform the mathematical operations to calculate M(1, 0) by using subsystem $402_{11}$ as follows: (1) initially, accumulator $108_{11}$ may receive reset signal $128_{11}$ so that accumulative value $124_{11}$ may be set equal to 0, (2) subsystem $402_{11}$ may calculate $(x_1)(h_{11})+(x_2)(h_{21})=(1)(1)+(2)(3)$ so that sum value $122_{11}$ is equal to 7, (3) then, in a first cycle of clock signal 126, accumulator $108_{11}$ may add existing sum value $122_{11}$, 7, to existing accumulative value $124_{11}$, 0, to produce a new accumulative value $124_{11}$, 7, while subsystem $402_{11}$ may calculate $(x_1)(h_{12})+(x_2)(h_{22})=(1)(2)+(2)(4)$ so that sum value $122_{11}$ is equal to 10, and (4) then, in a second cycle of clock signal 126, accumulator $108_{11}$ may add existing sum value $122_{11}$, 10, to existing accumulative value $124_{11}$, 7, to produce a new accumulative value $124_{11}$ equal to M(1, 0)=17.

Additionally, with reference to FIGS. 1 and 4, system 400 may, for example, perform the mathematical operations to calculate M(0, 0) as follows: (1) initially, accumulators $108_{12}$ and $416_2$ may receive reset signals $128_{12}$ and $424_2$ so that accumulative values $124_{11}$ and $420_2$ may be set equal to 0, (2) subsystem $402_{12}$ may calculate $h_{11}+h_{21}$ by using a constant 1 as one of the inputs for each of multipliers $102_{12}$ and $104_{12}$, $(1)(h_{11})+(1)(h_{21})=(1)(1)+(1)(3)$, so that sum value $122_{12}$ is equal to 4, (3) then, in a first cycle of clock signal 126, accumulator $108_{12}$ may add existing sum value $122_{12}$, 4, to existing accumulative value $124_{12}$, 0, to produce a new accumulative value $124_{12}$, 4, while accumulator $416_2$ may continue to receive reset signal $424_2$ so that accumulative value $420_2$ may remain set equal to 0, while subsystem $402_{12}$ may calculate $h_{12}+h_{22}$ by using a constant 1 as one of the inputs for each of multipliers $102_{12}$ and $104_{12}$, $(1)(h_{12})+(1)(h_{22})=(1)(2)+(1)(4)$, so that sum value $122_{12}$ is equal to 6, and then in a second cycle of clock signal 126, accumulator $108_{12}$ may add existing sum value $122_{12}$, 6, to existing accumulative value $124_{12}$, 4, to produce a new accumulative value $124_{12}$ equal to M(0, 0)=10, while accumulator $416_2$ may add existing sum value $412_2$, 6, to existing accumulative value $420_2$, 0, to produce a new accumulative value $420_2$, 6.

A subsequent processing circuit (not shown) may be used to calculate M(0, 1), $(y_1)(h_{11})+(y_2)(h_{12})+(y_1)(h_{21})+(y_2)(h_{22})$, by exploiting the distributive property of multiplication: $(a+b) \times c=(a \times c)+(b \times c)$. Here, the equation for M(0, 1) may be rearranged as $(y_1)(h_{11}+h_{21})+(y_2)(h_{12}+h_{22})$. Recall that in calculating M(0, 0), in the first cycle of clock signal 126, accumulator $108_{12}$ produced accumulative value $124_{12}$ equal to $(h_{11}+h_{21})=(1+3)=4$ and, in the second cycle of clock signal 126, accumulator $416_2$ produced accumulative value $420_2$ equal to $(h_{21}+h_{22})=(2+4)=6$. Accordingly, in the first cycle of clock signal 126, the subsequent processing circuit (not shown) may calculate $(y_1)(h_{11}+h_{21})=(1)(1+3)=4$ and, in the second cycle of clock signal 126, the subsequent processing circuit (not shown) may calculate $(y_2)(h_{12}+h_{22})=(2)(2+4)=12$. Thereafter, the subsequent processing circuit (not shown) may calculate M(0, 1)=$(y_1)(h_{11}+h_{21})+(y_2)(h_{12}+h_{22})=(1)(4)+(2)(6)=16$.

Once M(0, 0), M(1, 0), and M(0, 1) have been calculated, the subsequent processing circuit (not shown) or another subsequent processing circuit (not shown) may calculate $x_m$=M(1, 0)/M(0, 0)=17/10=1.7 and may calculate $y_n$=M(0, 1)/M(0,0)=16/10=1.6.

Matrix H used in the example described above was merely to illustrate how system 400 may be used to calculate the centroid of matrix H. One of skill in the art recognizes that system 400 may also be used to calculate the centroids of matrices having dimensions different from that of matrix H.

One of skill in the art recognizes that the following software interface may be used to support calculating jSum (M(1, 0)) and Divisor (M(0, 0)) for a centroid:

Centroid(ptr*input,X,Y,size_x,size_y,jSum,Divisor)

where:
input: input image
X, Y: co-ordinate of the block origin to the hardware primitive
size_x, size_y: size of the block on which the hardware will work (this needs to be smaller than or equal to what the hardware can support) (when smaller, this is used to mask the input to avoid wrong results)
jSum, Divisor: results returned by the centroid function for, respectively, 'j*sum of the column' and 'sum of the column'

One of skill in the art recognizes that where h equals the number of multipliers 102, 104, etc. per adder 106; p equals the number of subsystems 402 along first dimension 408; and q equals the number of subsystems 402 along second dimension 410, that the input format is 16 bits (although the same can be done for 8-bit input also), and that jSum (M(1, 0)) and Divisor (M(0, 0)) may be calculated for a centroid using the following pseudo code:

Each hardware call can be represented as below:

```
{  // hardware configuration
    For (i = 0 ; i < p/2 && i < size_x; i++)        // size_x <= p/2
        For (j = 0; j < q; j++)
            For (k = 0; k < h; k++)                 // sample inputs
            {
                j_o = Y + k + j*h
                if(k+j*h) < size_y)
                    IN_1×h[k] = IN[j_o][X+i]
                Else
                    IN_1×h[k] = 0
                C_1×h[k] = j_o                      // jCentroid
                Const_1×h[k] = 1
            }
            filter_1×h(IN_1×h, C_1×h, Out_L_X, null)
            A_jSum[i] =+ Out_L_X                    // jSum per column
            filter_1×h(IN_1×h, Const_1×h, Out_L_X null)
            A_divisor[i] =+ Out_L_X                 // Divisor per column
}
//Can be calculated in the processing element which receives the
jSum and Divisor as follows:
    iSum[i] = i*A_divisor[i] // since i is constant for the column
Multiple HW calls can be made and the result returned can be accumu-
lated
to give the Centroid of the picture or block area (N blocks
considered below):
    Centroid_i = Sum_1toN(A_jSum[i]/Sum_1toN(A_divisor[i])
    Centroid_i = Sum_1toN(iSum)/Sum_1toN(A_divisor[i])
```

General Methods for Performing Mathematical Operations

Figure 13:
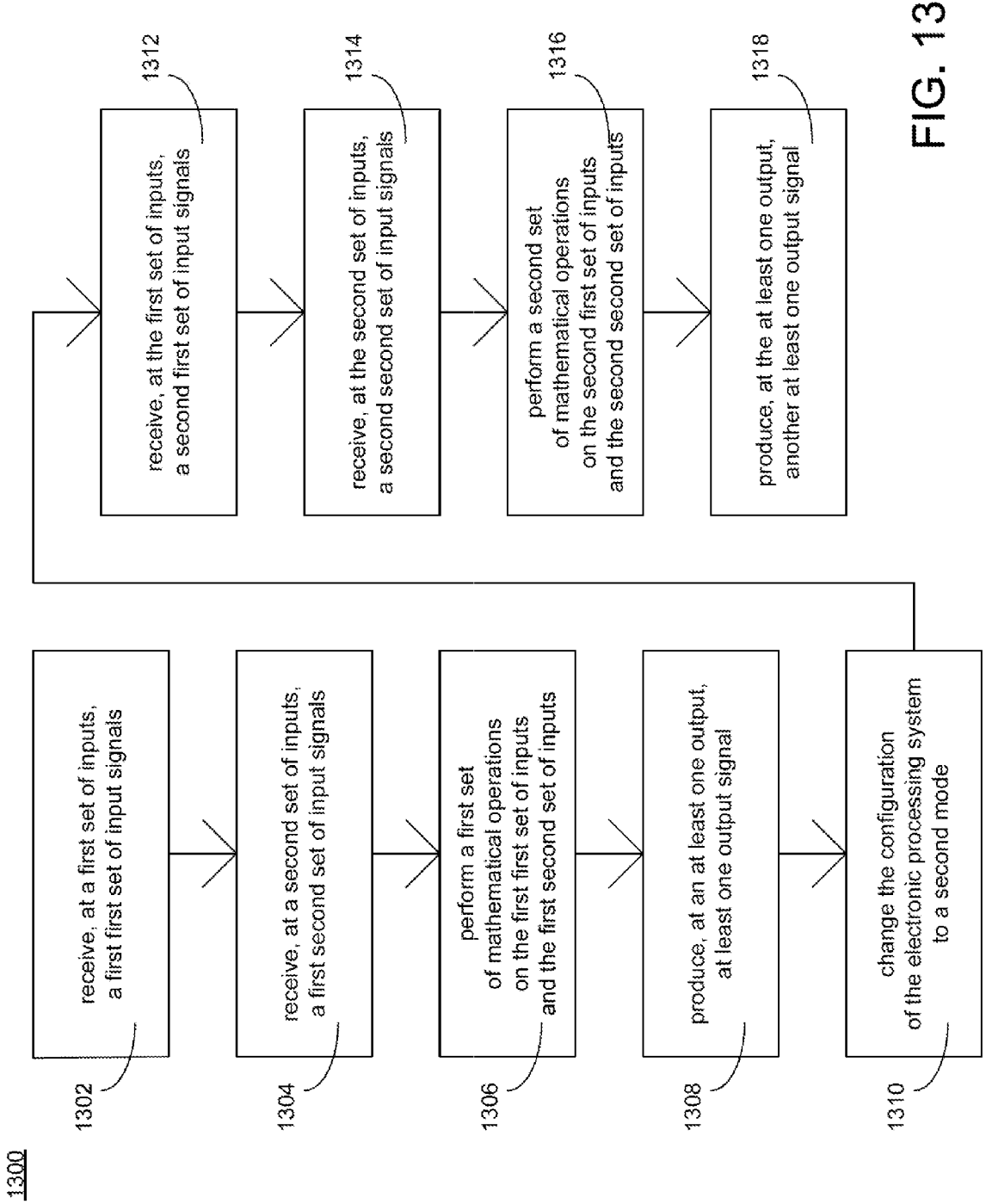
FIG. 13 is a process flowchart of an example method for performing mathematical operations, according to an embodiment.

FIG. 13 is a process flowchart of an example method for performing mathematical operations, according to an embodiment. A method 1300 in FIG. 13 may be performed using an electronic processing system that operates hardware, software, firmware, or some combination of these.

In method 1300, at 1302, the electronic processing system may receive, at a first set of inputs, a first first set of input signals.

At 1304, the electronic processing system may receive, at a second set of inputs, a first second set of input signals.

At 1306, the electronic processing system may perform a first set of mathematical operations on the first first set of input signals and the first second set of input signals. A configuration of the electronic processing system may be a first mode in which a signal path for an element of the first first set of input signals between a first input of the first set of inputs and a first output of the at least one output includes a first adder coupled directly to a second adder. For example, in the calculation of matrix N described above, the signal path for element $1_{11}$ between first multiplier 102 of subsystem $402_{11}$ and first large number of bits accumulator accumulative value $420_1$ may include adder 106 of subsystem $402_{11}$ coupled directly to first large number of bits adder $404_1$. Optionally, the first set of mathematical operations may be a convolution and the first first set of input signals may represent a one dimensional matrix of values. For example, in the calculation of matrix N described above, the first set of input signals may be equal to the first column of matrix L using clamped values.

Optionally, the signal path for the element of the first first set of input signals between the first input of the first set of inputs and the first output of the at least one output may include the first adder coupled directly to the second adder coupled directly to a third adder. For example, in the calculation of matrix O described above, the signal path for element 111 between first multiplier 102 of subsystem $402_{11}$ and first dimension accumulator accumulative value 434 may include adder 106 of subsystem $402_{11}$ coupled directly to first large number of bits adder $404_1$ coupled directly to first dimension adder 428. In this case, optionally, the first set of mathematical operations may be a convolution and the first first set of input signals represents a single value. For example, in the calculation of matrix O described above, the first set of input signals may be equal to the top, left element of matrix L using clamped values.

At 1308, the electronic processing system may produce, at an at least one output, at least one output signal.

Optionally, at 1310, the electronic processing system may change to a second mode in which the signal path for an element of a second first set of input signals between the first input of the first set of inputs and the first output of the at least one output may include only one adder. For example, in the calculation of matrix M described above, the signal path for element 111 between second multiplier 104 of subsystem $402_{11}$ and accumulative value 124 of subsystem $402_{11}$ may include only adder 106 of subsystem $402_{11}$.

Optionally, at 1312, the electronic processing system may receive, at the first set of inputs, the second first set of input signals.

Optionally, at 1314, the electronic processing system may receive, at the second set of inputs, a second second set of input signals.

Optionally, at 1316, the electronic processing system may perform a second set of mathematical operations on the second first set of input signals and the second set of input signals. In this case, optionally, the second set of mathematical operations may be one of a convolution, a matrix multiplication, and a cross correlation and the first first set of input signals represents a two dimensional matrix of values. For example, in the calculation of matrix J described above, the first set of input signals may be equal to matrix H. Likewise, in the calculations of matrices M and P described above, the first set of input signals may be equal to matrix L using mirrored or clamped values.

Optionally, at 1318, the electronic processing system, at the at least one output, may produce another at least one output signal.

Figure 14:
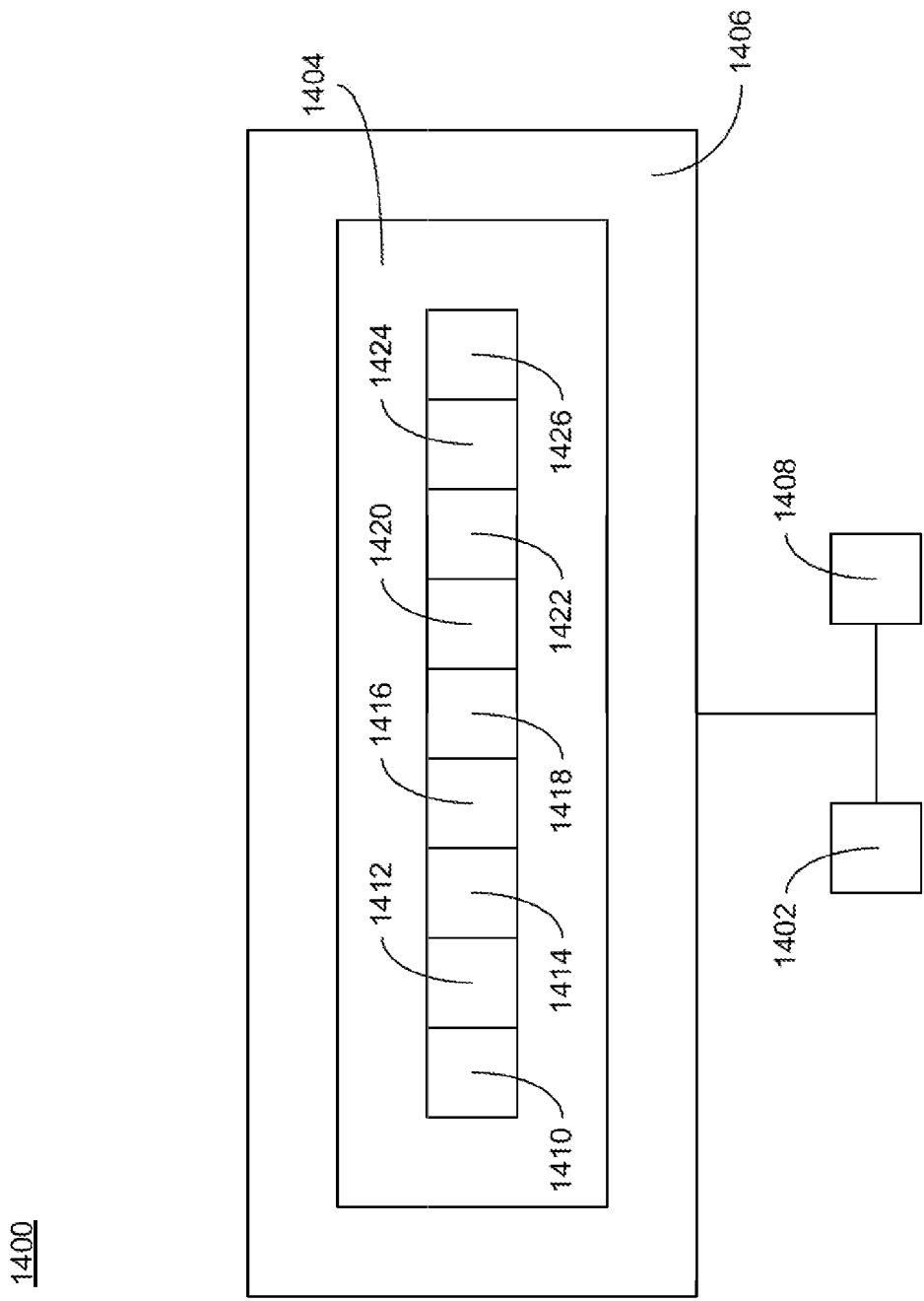
FIG. 14 is a block diagram of an example of software or firmware embodiments of method 1300, according to an embodiment.

FIG. 14 is a block diagram of an example of software or firmware embodiments of method 1100, according to an embodiment. In FIG. 14, an electronic processing system 1400 includes, for example, one or more programmable processor(s) 1402, a memory 1404, a computer program logic 1406, one or more I/O ports and/or I/O devices 1408, first receiving logic 1410, second receiving logic 1412, first performing logic 1414, and first producing logic 1416.

One or more programmable processor(s) 1402 may be configured to execute the functionality of system 400 as described above. Programmable processor(s) 1402 may include a central processing unit (CPU) and/or a graphics processing unit (GPU). Memory 1404 may include one or more computer readable media that may store computer program logic 1406. Memory 1404 may be implemented as a hard disk and drive, a removable media such as a compact disk, a read-only memory (ROM) or random access memory (RAM) device, for example, or some combination thereof. Programmable processor(s) 1402 and memory 1404 may be in communication using any of several technologies known to one of ordinary skill in the art, such as a bus. Computer program logic 1406 contained in memory 1404 may be read and executed by programmable processor(s) 1402. The one or more I/O ports and/or I/O devices 1408, may also be connected to processor(s) 1402 and memory 1404.

In the embodiment of FIG. 14, computer program logic 1406 may include first receiving logic 1410, which may be configured to receive, at a first set of inputs, a first first set of input signals. Computer program logic 1406 may also include second receiving logic 1412, which may be configured to receive, at a second set of inputs, a first second set of input signals. Computer program logic 1406 may also include first performing logic 1414, which may be configured to perform a first set of mathematical operations on the first first set of input signals and the first second set of input signals. Computer program logic 1406 may also include first producing logic 1416, which may be configured to produce, at an at least one output, at least one output signal.

Optionally, computer program logic 1406 may also include mode selection logic 1418, third receiving logic 1420, fourth receiving logic 1422, second performing logic 1424, and second producing logic 1426. Mode selection logic 1418 may be configured to change the configuration of the electronic processing system to a second mode. Third receiving logic 1420 may be configured to receive, at the first set of inputs, a second first set of input signals. Fourth receiving logic 1422 may be configured to receive, at the second set of inputs, a second second set of input signals. Second performing logic 1424 may be configured to perform a second set of mathematical operations on the second first set of input signals and the second second set of input signals. Second producing logic 1426 may be configured to produce, at the at least one output, another at least one output signal.

System 400 and method 1300 may be implemented in hardware, software, firmware, or some combination of these including, for example, second generation Intel® Core™ i processors i3/i5/i7 that include Intel® Quick Sync Video technology.

In embodiments, system 400 and method 1300 may be implemented as part of a wired communication system, a wireless communication system, or a combination of both. In embodiments, for example, system 400 and method 1300 may be implemented in a mobile computing device having wireless capabilities. A mobile computing device may refer to any device having an electronic processing system and a mobile power source or supply, such as one or more batteries, for example.

Examples of a mobile computing device may include a laptop computer, ultra-mobile personal computer, portable computer, handheld computer, palmtop computer, personal digital assistant (PDA), cellular telephone, combination cellular telephone/PDA, smart phone, pager, one-way pager, two-way pager, messaging device, data communication device, mobile Internet device, MP3 player, and so forth.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system for performing mathematical operations, comprising:
   subsystems, wherein each subsystem is coupled to simulate a unique position defined by a first dimension coordinate and a second dimension coordinate, wherein sets of the subsystems are defined by the first dimension coordinate, and wherein each subsystem is configured to receive pairs of input signals, to multiply the pairs of input signals to produce product signals, to add the product signals to produce a corresponding first sum signal, and to add, in conjunction with a cycle of a clock signal, the corresponding first sum signal to an accumulated sum of previous corresponding first sum signals to produce a corresponding first output signal; and
   first adders, wherein each first adder is coupled directly to a corresponding set of the subsystems and is configured to receive, from each of the subsystems in the corresponding set of the subsystems, the corresponding first sum signal and to produce a corresponding second sum signal.

2. The system of claim 1, wherein each subsystem comprises:
   a set of multipliers, wherein each multiplier of the set of multipliers is configured to receive a corresponding pair of the pairs of input signals and to produce a corresponding product signal;
   a second adder configured to receive, from each multiplier of the set of multipliers, the corresponding product signal and to produce the corresponding first sum signal; and
   a first accumulator configured to receive the corresponding first sum signal and to add, in conjunction with the cycle of the clock signal, the corresponding first sum signal to the accumulated sum of previous corresponding first sum signals to produce the corresponding first output signal.

3. The system of claim 2, wherein each first adder is a pair of first adders and wherein, for each subsystem, the set of multipliers is a pair of sets of multipliers, the second adder is a pair of second adders, and the first accumulator is a pair of first accumulators.

4. The system of claim 3, wherein a first adder of the pair of first adders is configured to operate in parallel with a second adder of the pair of first adders and wherein, for each subsystem, a first set of multipliers of the pair of sets of multipliers, a first adder of the pair of second adders, and a first accumulator of the pair of first accumulators are configured to operate in parallel with a second set of multipliers of the pair of sets of multipliers, a second adder of the pair of second adders, and a second accumulator of the pair of first accumulators.

5. The system of claim 3, wherein each subsystem further comprises:
   a bit shifter configured to receive the corresponding first sum signal of a first adder of the pair of second adders and to produce a corresponding bit-shifted first sum signal;
   a third adder configured to receive the corresponding first sum signal of a second adder of the pair of second adders and the corresponding bit-shifted first sum signal and to produce a corresponding third sum signal; and
   a multiplexer configured to receive the corresponding first sum signal of the second adder of the pair of second adders, the corresponding third sum signal, and a corresponding selector signal and to produce, dependent upon a value of the corresponding selector signal, one of the corresponding first sum signal of the second adder of the pair of second adders and the corresponding third sum signal;
wherein a first accumulator of the pair of first accumulators is configured to receive, dependent upon the value of the corresponding selector signal, one of the corresponding first sum signal of the second adder of the pair of second adders and the corresponding third sum signal.

6. The system of claim 3, further comprising, for each set of the subsystems, a pair of second accumulators, wherein:
a first accumulator of the pair of second accumulators is coupled to a corresponding first adder of the pair of first adders and is configured to receive the corresponding second sum signal of the corresponding first adder of the pair of first adders and to add, in conjunction with the cycle of the clock signal, the corresponding second sum signal of the corresponding first adder of the pair of first adders to an accumulated sum of previous corresponding second sum signals of the corresponding first adder of the pair of first adders to produce a first output signal of a corresponding pair of second output signals; and
a second accumulator of the pair of second accumulators is coupled to a corresponding second adder of the pair of first adders and is configured to receive the corresponding second sum signal of the corresponding second adder of the pair of first adders and to add, in conjunction with the cycle of the clock signal, the corresponding second sum signal of the corresponding second adder of the pair of first adders to an accumulated sum of previous corresponding second sum signals of the corresponding second adder of the pair of first adders to produce a second output signal of the corresponding pair of second output signals.

7. The system of claim 6, further comprising a pair of multiplexers, wherein, for each set of the subsystems, a first accumulator of the pair of first accumulators of a single subsystem is the first accumulator of the pair of second accumulators and a second accumulator of the pair of first accumulators of the single subsystem is the second accumulator of the pair of second accumulators, and wherein:
a first multiplexer of the pair of multiplexers is configured to receive the corresponding first sum signal of the first adder of the pair of second adders of the single subsystem, the corresponding second sum signal of the first adder of the pair of first adders, and a first selector signal and to produce, dependent upon a value of the first selector signal, one of the corresponding first sum signal of the first adder of the pair of second adders of the single subsystem and the corresponding second sum signal of the first adder of the pair of first adders;
the first accumulator of the pair of first accumulators of the single subsystem that is the first accumulator of the pair of second accumulators is configured to receive, dependent upon the value of the first selector signal, one of the corresponding first sum signal of the first adder of the pair of second adders of the single subsystem and the corresponding second sum signal of the first adder of the pair of first adders;
a second multiplexer of the pair of multiplexers is configured to receive the corresponding first sum signal of the second adder of the pair of second adders of the single subsystem, the corresponding second sum signal of the second adder of the pair of first adders, and a second selector signal and to produce, dependent upon a value of the second selector signal, one of the corresponding first sum signal of the second adder of the pair of second adders of the single subsystem and the corresponding second sum signal of the second adder of the pair of first adders; and
the second accumulator of the pair of first accumulators of the single subsystem that is the second accumulator of the pair of second accumulators is configured to receive, dependent upon the value of the second selector signal, one of the corresponding first sum signal of the second adder of the pair of second adders of the single subsystem and the corresponding second sum signal of the second adder of the pair of first adders.

8. The system of claim 6, further comprising: a third adder coupled directly to each pair of first adders and configured to receive, from each pair of first adders, the corresponding second sum signal and to produce a third sum signal.

9. The system of claim 8, further comprising: a third accumulator configured to receive the third sum signal and to add, in conjunction with the cycle of the clock signal, the third sum signal to an accumulated sum of previous the third sum signals to produce a third output signal.

10. The system of claim 9, further comprising a multiplexer, wherein a first accumulator of the pair of first accumulators of a single subsystem of a single set of the subsystems is the first accumulator of the pair of second accumulators of the single set of the subsystems is the third accumulator, and wherein:
the multiplexer is configured to receive the corresponding first sum signal of the first adder of the pair of second adders of the single subsystem of the single set of the subsystems, the corresponding second sum signal of the first adder of the pair of first adders of the single set of the subsystems, the third sum signal, and a selector signal and to produce, dependent upon a value of the selector signal, one of the corresponding first sum signal of the first adder of the pair of second adders of the single subsystem of the single set of the subsystems, the corresponding second sum signal of the first adder of the pair of first adders of the single set of the subsystems, and the third sum signal;
the first accumulator of the pair of first accumulators of the single subsystem of the single set of the subsystems that is the first accumulator of the pair of second accumulators of the single set of the subsystems that is the third accumulator is configured to receive, dependent upon the value of the selector signal, one of the corresponding first sum signal of the first adder of the pair of second adders of the single subsystem of the single set of the subsystems, the corresponding second sum signal of the first adder of the pair of first adders of the single set of the subsystems, and the third sum signal.

11. A system for performing mathematical operations, comprising:
a first subsystem, a second subsystem, a third subsystem, and a fourth subsystem, wherein each of the first subsystem, the second subsystem, the third subsystem, and the fourth subsystem has a first set of multipliers, a second set of multipliers, a first adder, a second adder, a third adder, a first accumulator, a second accumulator, a bit shifter, and a first multiplexer, each multiplier of the first set of multipliers and the second set of multipliers is coupled to two inputs, outputs of the first set of multipliers are coupled to the first adder, outputs of the second set of multipliers are coupled to the second adder, an output of the first adder is coupled to a first output, the first accumulator, and the bit shifter, an output of the bit shifter is coupled to the third adder, an output of the third adder is coupled to the first multiplexer, an output of the first multiplexer is coupled to a second output and the second accumulator, an output of the second adder is coupled to the third adder and the first multiplexer, an output of the first accumulator is coupled to a third output, and an output of the second accumulator is coupled to a fourth output;

a fourth adder coupled directly to the first output of the first subsystem and the first output of the second subsystem;

a fifth adder coupled directly to the second output of the first subsystem and the second output of the second subsystem; a sixth adder coupled directly to the first output of the third subsystem and the first output of the fourth subsystem; and a seventh adder coupled directly to the second output of the third subsystem and the second output of the fourth sub system.

12. The system of claim 11, wherein the fourth adder is configured to operate in parallel with the fifth adder, the sixth adder is configured to operate in parallel with the seventh adder, and, for each of the first subsystem, the second subsystem, the third subsystem, and the fourth subsystem, the first set of multipliers, the first adder, and the first accumulator are configured to operate in parallel with the second set of multipliers, the second adder, and the second accumulator.

13. The system of claim 11, wherein the output of the third adder has a greater number of bits than the output of the first adder.

14. The system of claim 11, further comprising:
a third accumulator coupled to an output of the fourth adder;
a fourth accumulator coupled to an output of the fifth adder;
a fifth accumulator coupled to an output of the sixth adder; and
a sixth accumulator coupled to an output of the seventh adder.

15. The system of claim 14, wherein the first accumulator of the first subsystem is the third accumulator and the second accumulator of the first subsystem is the fourth accumulator and further comprising:
a second multiplexer coupled to the first output of the first subsystem and the output of the fourth adder; and
a third multiplexer coupled to the second output of the first subsystem and the output of the fifth adder.

16. The system of claim 14, further comprising an eighth adder coupled directly to the output of the fourth adder, the output of the fifth adder, the output of the sixth adder, and the output of the seventh adder.

17. The system of claim 16, further comprising a seventh accumulator coupled to the output of the eighth adder.

18. The system of claim 17, wherein the second accumulator of the first subsystem is the fourth accumulator and the seventh accumulator and further comprising a fourth multiplexer coupled to the second output of the first subsystem, the output of the fifth adder, and the output of the eighth adder.

19. A method for performing mathematical operations, comprising:
receiving, at a first set of inputs of an electronic processing system, a first first set of input signals;
receiving, at a second set of inputs of the electronic processing system, a first second set of input signals;
performing, by the electronic processing system, a first set of mathematical operations on the first first set of input signals and the first second set of input signals; and
producing, at an at least one output of the electronic processing system, at least one output signal with a configuration of the electronic processing system in a first mode in which a signal path for an element of the first first set of input signals between a first input of the first set of inputs and a first output of the at least one output includes a first adder coupled directly to a second adder,
changing the configuration of the electronic processing system to a second mode in which the signal path for an element of a second first set of input signals between the first input of the first set of inputs and the first output of the at least one output includes only one adder;
receiving, at the first set of inputs of the electronic processing system, the second first set of input signals;
receiving, at the second set of inputs of the electronic processing system, a second second set of input signals;
performing, by the electronic processing system, a second set of mathematical operations on the second first set of input signals and the second second set of input signals; and
producing, at the at least one output of the electronic processing system, another at least one output signal.

20. The method of claim 19, wherein the first set of mathematical operations is a convolution and the first first set of input signals represents a one dimensional matrix of values.

21. The method of claim 19, wherein the signal path for the element of the first first set of input signals between the first input of the first set of inputs and the first output of the at least one output includes the first adder coupled directly to the second adder coupled directly to a third adder.

22. The method of claim 21, wherein the first set of mathematical operations is a convolution and the first first set of input signals represents a single value.

23. The method of claim 19 wherein the second set of mathematical operations is one of a convolution, a matrix multiplication, and a cross correlation and the first first set of input signals represents a two dimensional matrix of values.

24. A non-transitory machine-readable medium storing instructions which, when executed by an electronic processing system, cause the electronic processing system to perform instructions for:
receiving, at a first set of inputs of an electronic processing system, a first first set of input signals;
receiving, at a second set of inputs of the electronic processing system, a first second set of input signals;
performing, by the electronic processing system, a first set of mathematical operations on the first first set of input signals and the first second set of input signals, and producing, at an at least one output of the electronic processing system, at least one output signal with a configuration of the electronic processing system in a first mode in which a signal path for an element of the first first set of input signals between a first input of the first set of inputs and a first output of the at least one output includes a first adder coupled directly to a second adder;
changing the configuration of the electronic processing system to a second mode in which the signal path for an element of a second first set of input signals between the first input of the first set of inputs and the first output of the at least one output includes only one adder;

receiving, at the first set of inputs of the electronic processing system, the second first set of input signals;

receiving, at the second set of inputs of the electronic processing system, a second second set of input signals;

performing, by the electronic processing system, a second set of mathematical operations on the second first set of input signals and the second second set of input signals; and producing, at the at least one output of the electronic processing system, another at least one output signal.

25. The non-transitory machine-readable medium of claim 24, wherein the first set of mathematical operations is a convolution and the first first set of input signals represents a one dimensional matrix of values.

26. The non-transitory machine-readable medium of claim 24, wherein the signal path for the element of the first first set of input signals between the first input of the first set of inputs and the first output of the at least one output includes the first adder coupled directly to the second adder coupled directly to a third adder.

27. The non-transitory machine-readable medium of claim 26, wherein the first set of mathematical operations is a convolution and the first first set of input signals represents a single value.

28. The non-transitory machine-readable medium of claim 24, wherein the second set of mathematical operations is one of a convolution, a matrix multiplication, and a cross correlation and the first first set of input signals represents a two dimensional matrix of values.

\* \* \* \* \*